United States Patent
Oteri et al.

(10) Patent No.: US 11,165,476 B2
(45) Date of Patent: Nov. 2, 2021

(54) ADAPTATION OF MIMO MODE IN MMW WLAN SYSTEMS

(71) Applicant: INTERDIGITAL PATENT HOLDINGS, INC., Wilmington, DE (US)

(72) Inventors: Oghenekome Oteri, San Diego, CA (US); Hanqing Lou, Syosset, NY (US); Xiaofei Wang, Cedar Grove, NJ (US); Li-Hsiang Sun, San Diego, CA (US); Alphan Sahin, Westbury, NY (US); Rui Yang, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/319,083

(22) PCT Filed: Jul. 21, 2017

(86) PCT No.: PCT/US2017/043216
§ 371 (c)(1),
(2) Date: Jan. 18, 2019

(87) PCT Pub. No.: WO2018/017920
PCT Pub. Date: Jan. 25, 2018

(65) Prior Publication Data
US 2021/0028839 A1    Jan. 28, 2021

Related U.S. Application Data

(60) Provisional application No. 62/365,115, filed on Jul. 21, 2016, provisional application No. 62/367,298, filed on Jul. 27, 2016.

(51) Int. Cl.
*H04B 7/06* (2006.01)

(52) U.S. Cl.
CPC ......... *H04B 7/0617* (2013.01); *H04B 7/0695* (2013.01)

(58) Field of Classification Search
CPC ........................... H04B 7/0617; H04B 7/0695
See application file for complete search history.

(56) References Cited

U.S. PATENT DOCUMENTS

| 8,767,683 B2 * | 7/2014 | Liu ................... H04W 72/0446 370/336 |
| 10,015,800 B2 * | 7/2018 | Jo ........................ H04B 7/0619 |

(Continued)

FOREIGN PATENT DOCUMENTS

| CN | 101577610 A | 11/2009 |
| CN | 104581739 A | 4/2015 |

(Continued)

OTHER PUBLICATIONS

Agilent Technologies, "Wireless LAN and 60 GHz—IEEE 802.11ad Explained," pp. 1-28 (May 20, 2013).

(Continued)

*Primary Examiner* — Kenneth T Lam
(74) *Attorney, Agent, or Firm* — Volpe Koenig

(57) ABSTRACT

Systems, methods, and instrumentalities are disclosed for adaptation of multiple input multiple output (MIMO) mode in mmW Wireless Local Area Network (WLAN) systems. A first station (STA) may receive a mode change request from a second STA. The mode change request may indicate a mode change for a MIMO mode, a polarization mode, and/or an orthogonal frequency-division multiple access (OFDMA) mode. The mode change request may include one or more STA fields. The one or more STA fields may include a STA field associated with the first STA. Each of the one or more STA fields may include a MIMO mode subfield, a polarization mode subfield, and/or an OFDMA mode subfield. The first STA may change the MIMO mode, the (Continued)

polarization mode, and/or the OFDMA mode, for example, based on the mode change request. The first STA may send a mode change response to the second STA.

20 Claims, 33 Drawing Sheets

(56) References Cited

U.S. PATENT DOCUMENTS

| | | | |
|---|---|---|---|
| 2009/0252140 A1* | 10/2009 | Imaeda | H04B 7/0805 370/342 |
| 2013/0301454 A1 | 11/2013 | Seol et al. | |
| 2014/0307654 A1 | 10/2014 | Kim | |
| 2015/0229364 A1* | 8/2015 | Kim | H04L 25/03343 370/329 |
| 2015/0244432 A1 | 8/2015 | Wang | |
| 2016/0149302 A1 | 5/2016 | Sanderovich et al. | |
| 2016/0149633 A1* | 5/2016 | Sanderovich | G01S 5/0289 375/267 |
| 2016/0164800 A1 | 6/2016 | Eitan et al. | |
| 2016/0329938 A1* | 11/2016 | Jo | H04W 72/082 |
| 2017/0070275 A1* | 3/2017 | Jo | H04B 7/0408 |
| 2017/0078013 A1* | 3/2017 | Sanderovich | H04B 7/0469 |
| 2017/0079031 A1* | 3/2017 | Maltsev, Jr. | H04B 7/0452 |
| 2017/0126363 A1 | 5/2017 | Wang et al. | |
| 2017/0156067 A1 | 6/2017 | Huang | |
| 2019/0140730 A1* | 5/2019 | Oteri | H04B 7/0417 |
| 2020/0036416 A1* | 1/2020 | Murakami | H04B 7/0615 |

FOREIGN PATENT DOCUMENTS

| | | |
|---|---|---|
| WO | 2017/156315 | 9/2017 |
| WO | 2017/197189 | 11/2017 |

OTHER PUBLICATIONS

Chen et al., "MAC and PHY Proposal for 802.11af," IEEE 802.11-10/0258r0 (Mar. 2010).
Cordeiro, "Specification Framework for TGay," IEEE P802.11 Wireless LANs, IEEE 802.11-15/1358r4 (Jun. 13, 2016).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Halasz, "Sub 1 GHz license-exempt PAR and 5C," IEEE P802.11 Wireless LANs, IEEE 802.11-10/0001r13 (Jul. 2010).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).

IEEE P802.11ah/D5.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D5.0 (Mar. 2015).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
Maltsev et al., "Channel Models for IEEE 802.11ay," P802.11 Wireless LANs, IEEE 802.11-15/1150r4 (Sep. 12, 2015).
Sun et al., "IEEE 802.11 TGay Use Cases," IEEE 802.11-2015/0625r2 (May 2015).
Sun et al., "Link Level Performance Comparisons of Open Loop, Closed Loop and Antenna Selection for SU-MIMO," IEEE 802.11-16/0911r1 (Jul. 25, 2016).
Cordeiro, "EDMG Support Discovery," IEEE 802.11-16/0372r0 (Mar. 13, 2016).
Jo et al., "Generalized Multi-Beamforming for 11ay," IEEE 802.11-16/0398r1 (Mar. 17, 2016).
Jo et al., "Multi-Beamforming in Polarized Channels for 11ay," IEEE 802.11-16/0092r1 (Jan. 21, 2016).
Wang et al., "Antenna Polarization and Beamforming for 11ay," IEEE 802.11-16/0700r0 (May 16, 2016).

* cited by examiner

| Frame Control | Duration | RA | TA | SSW | SSW Feedback | FCS |
|---|---|---|---|---|---|---|
| 2 | 2 | 6 | 6 | 3 | 3 | 4 |

Octets:

FIG. 4

| B0 | B1 — B9 | B10 — B15 | B16 — B17 | B18 — B23 |
|---|---|---|---|---|
| Direction | CDOWN | Sector ID | DMG Antenna ID | RXSS Length |
| 1 | 9 | 6 | 2 | 6 |

Bits:

| Total Sectors in ISS | Number of RX DMG Antennas | Reserved | Poll Required | Reserved |
|---|---|---|---|---|
| B0 ... B8 | B9 B10 | B11 ... B15 | B16 | B17 ... B23 |
| 9 | 2 | 5 | 1 | 7 |

Bits:

FIG. 7

| Sector Select | DMG Antenna Select | SNR Report | Poll Required | Reserved |
|---|---|---|---|---|
| B0 ... B5 | B6 B7 | B8 ... B15 | B16 | B17 ... B23 |
| 6 | 2 | 8 | 1 | 7 |

Bits:

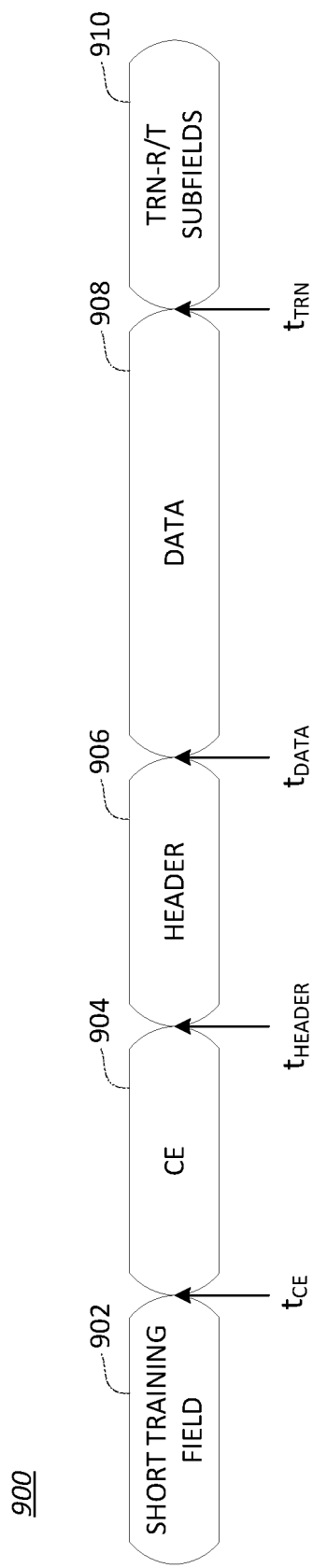

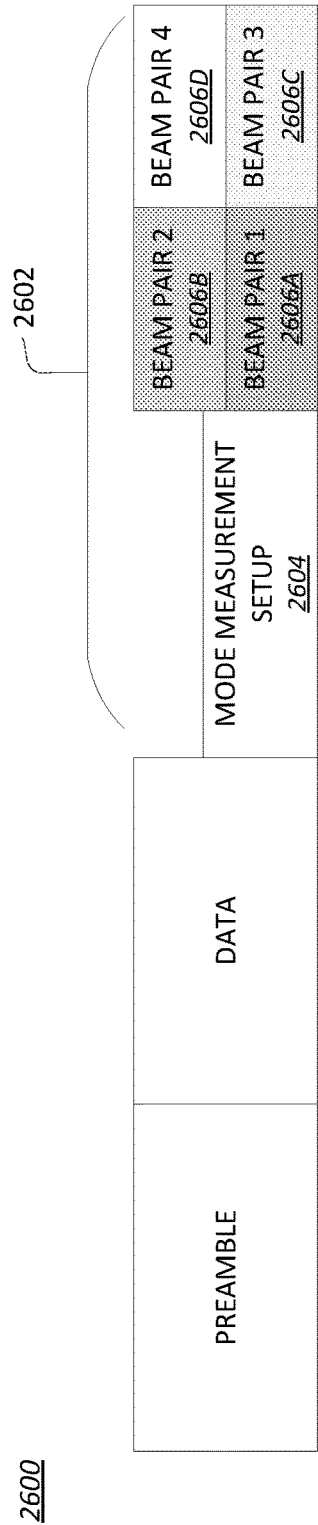

| QO CALIBRATION SETUP 3002 | QO BEAM CEF 3004 | BEAM CEF 3006 |

FIG. 30

| QO CALIBRATION SETUP 3102 | QO BEAM CEF 3104 | BEAM 1 CEF 3106 | BEAM 2 CEF 3108 | BEAM 3 CEF 3110 |

FIG. 31

ADAPTATION OF MIMO MODE IN MMW WLAN SYSTEMS

CROSS-REFERENCE

This application is the U.S. National Stage, under 35 U.S.C. § 371, of International Application No. PCT/US2017/043216 filed Jul. 21, 2017, which claims the benefit of U.S. Provisional Application No. 62/365,115 filed on Jul. 21, 2016, U.S. Provisional Application No. 62/367,298 filed Jul. 27, 2016 all of which are incorporated by reference herein.

BACKGROUND

A Wireless Local Area Network (WLAN) may have multiple modes of operation, such as an Infrastructure Basic Service Set (BSS) mode and an Independent BSS (IBSS) mode. A WLAN in Infrastructure BSS mode may have an Access Point (AP) for the BSS. One or more wireless transmit receive units (WTRUs), e.g., stations (STAs), may be associated with an AP. An AP may have access or an interface to a Distribution System (DS) or other type of wired/wireless network that carries traffic in and out of a BSS. Traffic to STAs that originates from outside a BSS may arrive through an AP, which may deliver the traffic to the STAs. In certain WLAN systems STA to STA communication may take place. In certain WLAN systems an AP may act in the role of a STA. Beamforming may be used by WLAN devices. Current beamforming techniques may be limited.

SUMMARY

Systems, methods, and instrumentalities are disclosed for adaptation of multiple input multiple output (MIMO) mode in mmW WLAN systems. A first station (STA) may receive a mode measurement setup frame from a second STA. The mode measurement setup frame may indicate the first STA, one or more transmit beams, and one or more of a MIMO mode, a polarization mode, or an orthogonal frequency-division multiple access (OFDMA) mode. The first STA may enable the MIMO mode, the polarization mode, and/or the OFDMA mode indicated in the mode measurement setup frame. The first STA may measure the one or more transmit beams during a first training period. The first STA may receive a dummy signal before the training period. The first STA may send, to the second STA, first training feedback associated with the one or more transmit beams.

The first STA may receive a mode change request from the second STA. The mode change request may indicate a mode change for the MIMO mode, the polarization mode, and/or the OFDMA mode. The mode change request may include one or more STA fields. The one or more STA fields may include a STA field associated with the first STA. Each of the one or more STA fields may include a MIMO mode subfield, a polarization mode subfield, and/or an OFDMA mode subfield. The mode change request may include a training indicator. The training indicator may initiate a second training period associated with the mode change. The first STA may change the MIMO mode, the polarization mode, and/or the OFDMA mode, for example, based on the mode change request. The first STA may send a mode change response to the second STA. The mode change response may be associated with the change to the MIMO mode, the polarization mode, and/or the OFDMA mode. The mode change response may include second training feedback. The second training feedback may be associated with the one or more transmit beams during the second training period. The mode change response may indicate a success status, a failure status, or an alternative status associated with the mode change. The mode change response may include a MIMO mode response field, a polarization mode response field, an OFDMA mode response field, a training feedback field, and/or a time field.

When the mode change includes a MIMO mode change, the MIMO mode subfield of the STA field associated with the first STA may include an add or remove indication, a transmit or receive indication, a single user (SU) MIMO or multi-user (MU) MIMO mode indication, and/or a maximum number of streams indication. When the mode change includes a polarization mode change, the polarization mode subfield of the STA field associated with the first STA may include an add or remove indication, a transmit or receive indication, and/or a polarization type indication. When the mode change includes an OFDMA mode change, the OFDMA mode subfield of the STA field associated with the first STA may include an add or remove indication, a transmit or receive indication, a backwards compatibility indication, and/or a bandwidth indication.

BRIEF DESCRIPTION OF THE DRAWINGS

FIG. 4 is an exemplary sector sweep (SSW) frame format.
FIG. 5 is an exemplary SSW field in a SSW frame.
FIG. 6 is an exemplary SSW feedback field in a SSW frame when not transmitted as part of an ISS.
FIG. 7 is an exemplary SSW feedback field in a SSW frame when transmitted as part of an initiator sector sweep (ISS).
FIG. 9 is an exemplary directional multi gigabit (DMG) PPDU format.
FIG. 10 is an exemplary enhanced DMG (EDMG) PPDU format.

FIG. 26 is an exemplary sequential and parallel measurement.

FIG. 27 is an exemplary feedback per beam pair.

FIG. 28 is an exemplary standalone sequential measurement frame.

FIG. 30 is an exemplary frame for STA-specific penalty calibration.

FIG. 31 is an exemplary frame for beam-sweep penalty calibration.

DETAILED DESCRIPTION

Figure 1:
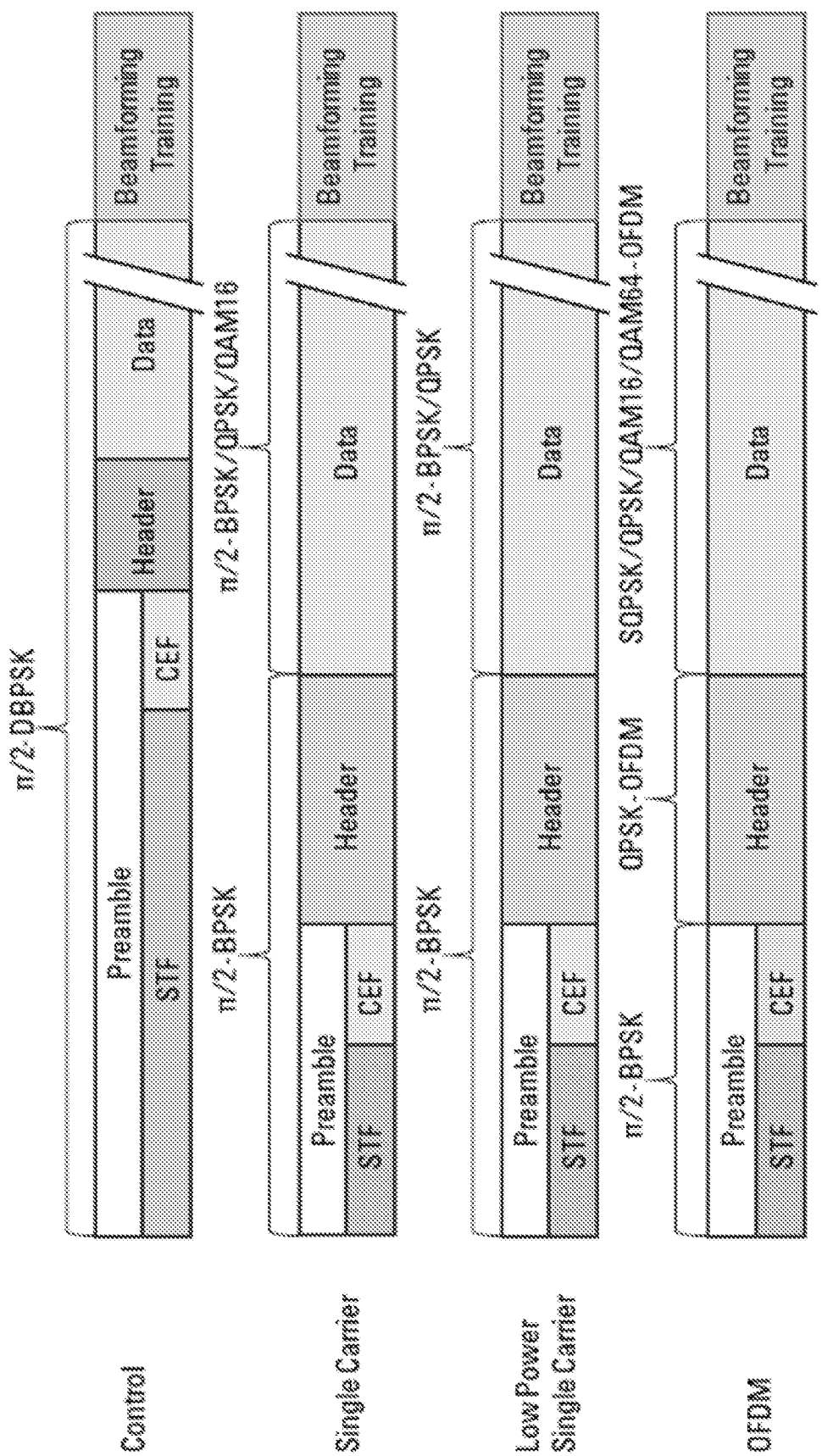
FIG. 1 depicts example 802.11ad PHY packet structures.

A detailed description of illustrative embodiments will now be described with reference to the various Figures. Although this description provides a detailed example of possible implementations, it should be noted that the details are intended to be exemplary and in no way limit the scope of the application.

A Wireless Local Area Network (WLAN) may have multiple modes of operation, such as an Infrastructure Basic Service Set (BSS) mode and an Independent BSS (IBSS) mode. A WLAN in BSS mode may have an Access Point (AP/PCP) for the BSS. One or more stations (STAs) may be associated with an AP/PCP. An AP/PCP may have access or an interface to a Distribution System (DS) or another type of wired/wireless network that carries traffic in and out of a BSS. Traffic to STAs that originates from outside a BSS may arrive through an AP/PCP, which may deliver the traffic to the STAs. Traffic originating from STAs to destinations outside a BSS may be sent to an AP/PCP, which may deliver the traffic to the respective destinations. Traffic between STAs within a BSS may be sent through an AP/PCP, e.g., from a source STA to the AP/PCP and from the AP/PCP to the destination STA. Traffic between STAs within a BSS may be peer-to-peer traffic. Peer-to-peer traffic may be sent directly between the source and destination STAs, for example, with a direct link setup (DLS) using an 802.11e DLS or an 802.11z tunneled DLS (TDLS). A WLAN in IBSS mode may not have an AP/PCP, and/or STAs may communicate directly with each other. An IBSS mode of communication may be referred to as an "ad-hoc" mode of communication.

An AP/PCP may transmit a beacon on a fixed channel (e.g., the primary channel), for example, in an 802.11ac infrastructure mode of operation. A channel may be, for example, 20 MHz wide. A channel may be an operating channel of the BSS. A channel may be used by the STAs, for example, to establish a connection with an AP/PCP. A channel access mechanism in an 802.11 system is Carrier Sense Multiple Access with Collision Avoidance (CSMA/CA). A STA, including an AP/PCP, may sense a primary channel, for example, in a CSMA/CA mode of operation. A STA may back off, for example, when a channel is detected to be busy so that only one STA may transmit at a time in a given BSS.

High Throughput (HT) STAs may use, for example, a 40 MHz wide channel for communication, e.g., in 802.11n. A primary 20 MHz channel may be combined with an adjacent 20 MHz channel to form a 40 MHz wide contiguous channel.

Very High Throughput (VHT) STAs may support, for example, 20 MHz, 40 MHz, 80 MHz, and 160 MHz wide channels, e.g., in 802.11ac. 40 MHz and 80 MHz channels may be formed, for example, by combining contiguous 20 MHz channels. A 160 MHz channel may be formed, for example by combining eight contiguous 20 MHz channels or by combining two non-contiguous 80 MHz channels, which may be referred to as an 80+80 configuration. An 80+80 configuration may be passed through a segment parser that divides data into two streams, for example, after channel encoding. IFFT and time domain processing may be performed, for example, on each stream separately. Streams may be mapped onto two channels. Data may be transmitted on the two channels. A receiver may reverse a transmitter mechanism. A receiver may recombine data transmitted on multiple channels. Recombined data may be sent to the Media Access Control (MAC).

Sub 1 GHz (e.g., MHz) modes of operation may be supported, for example, by 802.11af 802.11ah. Channel operating bandwidths and carriers may be reduced, for example, relative to bandwidths and carriers used in 802.11n and 802.11ac. 802.11af may support 5 MHz, 10 MHz, and 20 MHz bandwidths in a TV White Space (TVWS) spectrum. 802.11ah may support 1 MHz, 2 MHz, 4 MHz, 8 MHz, and 16 MHz bandwidths in non-TVWS spectrum. An example of a use case for 802.11ah may be support for Meter Type Control (MTC) devices in a macro coverage area. MTC devices may have limited capabilities (e.g., limited bandwidths) and may be designed to have a very long battery life.

WLAN systems (e.g., 802.11n, 802.11ac, 802.11af, and 802.11ah systems) may support multiple channels and channel widths, such as a channel designated as a primary channel. A primary channel may, for example, have a bandwidth equal to the largest common operating bandwidth supported by STAs in a BSS. Bandwidth of a primary channel may be limited by a STA that supports the smallest bandwidth operating mode. In an example of 802.11ah, a primary channel may be 1 MHz wide, for example, if there are one or more STAs (e.g., MTC type devices) that support a 1 MHz mode while an AP/PCP and other STAs may support a 2 MHz, 4 MHz, 8 MHz, 16 MHz, or other channel bandwidth operating modes. Carrier sensing and NAV settings may depend on the status of a primary channel. As an example, all available frequency bands may be considered busy and remain idle despite being available, for example, when a primary channel has a busy status due to a STA that supports a 1 MHz operation mode transmitting to an AP/PCP on the primary channel.

Available frequency bands may vary between different regions. As an example, in the United States, available frequency bands used by 802.11ah may be 902 MHz to 928 MHz. As another example, in Korea, available frequency bands may be 917.5 MHz to 923.5 MHz. As another example, in Japan, available frequency bands may be 916.5 MHz to 927.5 MHz. The total bandwidth available for 802.11ah may be 6 MHz to 26 MHz depending on the country code.

802.11ac may support downlink Multi-User MIMO (MU-MIMO) transmission to multiple STAs in the same symbol's time frame, e.g. during a downlink OFDM symbol. MU-MIMO transmission may improve spectral efficiency. 802.11ah may support downlink MU-MIMO. Downlink MU-MIMO may use the same symbol timing to multiple STAs and the waveform transmissions to the multiple STAs may not interfere with each other. One or more STAs in MU-MIMO transmission with an AP/PCP may use the same channel or band, which may limit the operating bandwidth to the smallest channel bandwidth that is supported by the one or more STAs in MU-MIMO transmission with the AP/PCP.

802.11ad is an amendment to the WLAN standard, which specifies the MAC and PHY layers for very high throughput (VHT) in the 60 GHz band. 802.11ad may support data rates up to 7 Gbits/s. 802.11ad may support three different modulation modes. 802.11ad may support control of PHY with single carrier and spread spectrum. 802.11ad may support single carrier PHY. 802.11ad may support OFDM PHY. 802.11ad may use 60 GHz unlicensed band, which may available globally. At 60 GHz, the wavelength may be 5 mm, which may make compact and competitive antenna or antenna arrays possible. A compact and competitive antenna may create narrow RF beams at both transmitter and receiver, which may effectively increase the coverage range and/or reduce the interference.

FIG. 1 depicts example 802.11ad PHY packet structures. 802.11ad (e.g., 802.11ad-2012) DMG PHY may support one or more PHY packet (e.g., frame) structures, for example, such as Control PHY, Signal Carrier PHY, Low Power Single Carrier PHY, and OFDM PHY.

Figure 2:
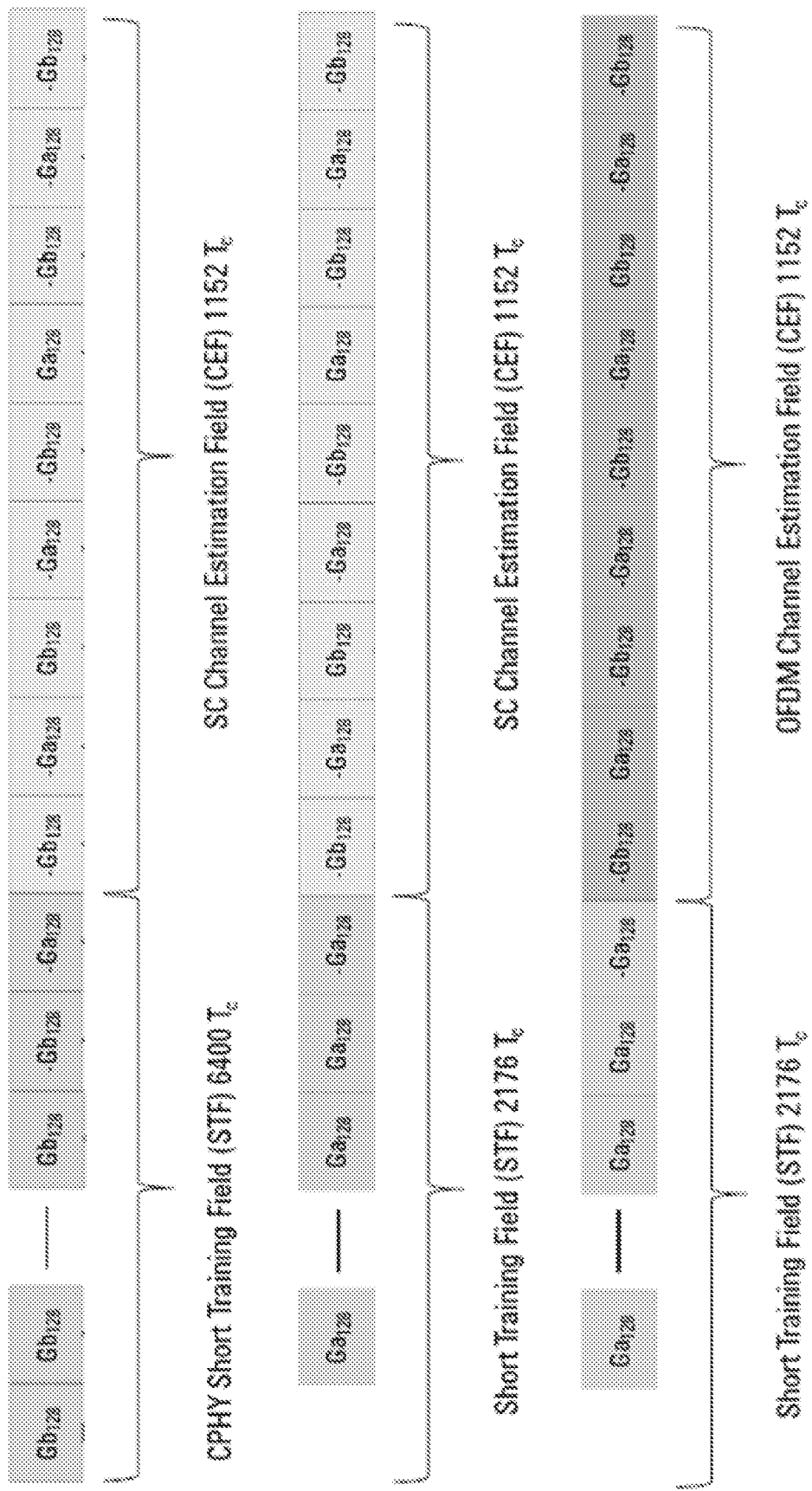
FIG. 2 depicts example preamble structures.

FIG. 2 depicts example preamble structures. 802.11ad PHY packet structures may share the same preamble structure. The preamble may include a short training field (STF) and/or a channel estimation field (CEF). The CEF may be represented as CE. The STF and CEF may be constructed from a $\pi/2$ (D)BPSK modulated repeating Golay sequence, for example, as shown in FIG. 2.

The frame structure of 802.11ad may facilitate beamforming training (e.g., discovery and tracking). The beamforming (BF) training protocol may include two or more components: a sector level sweep (SLS), a beam refinement protocol (BRP), and/or the like. The SLS may be used for transmit beamforming training. The BRP may enable receive beamforming training and/or iterative refinement of both the transmit and receive beams.

MIMO transmissions, including both SU-MIMO and MU-MIMO, may not be supported by 802.11ad.

Figure 3:
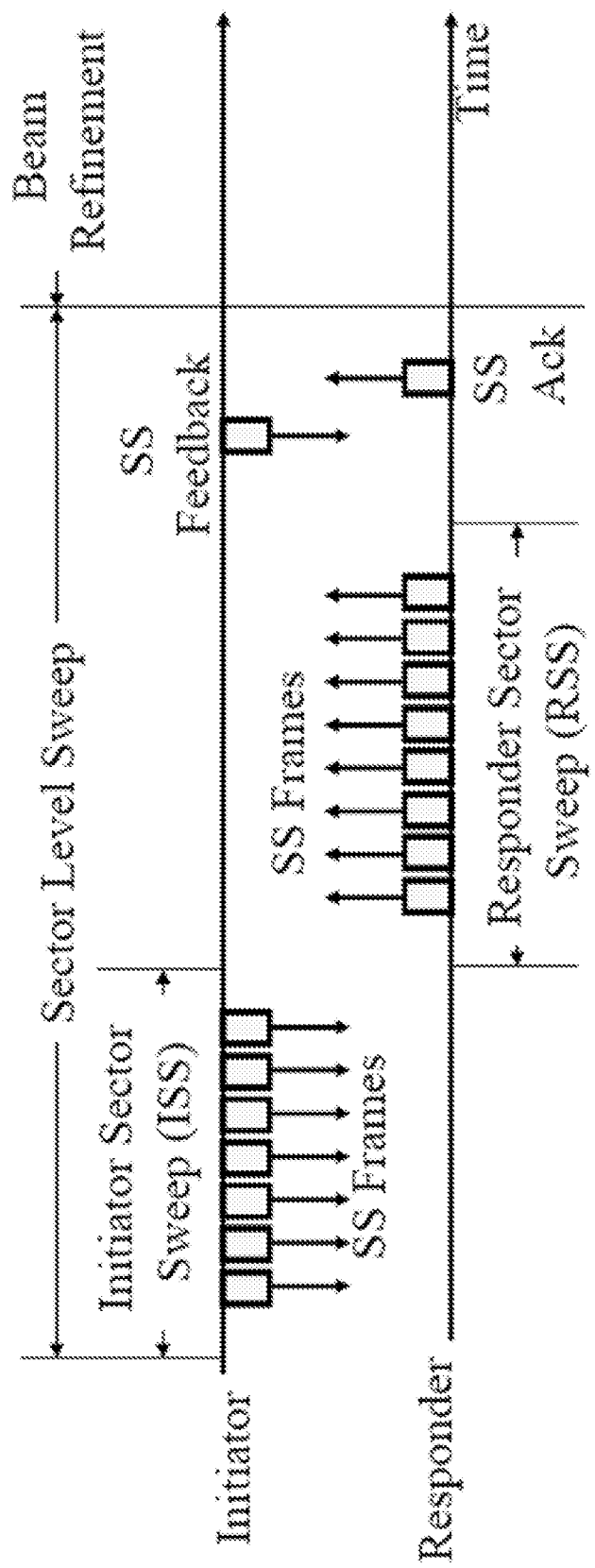
FIG. 3 is an exemplary sector level sweep (SLS) training.

FIG. 3 is an exemplary sector level sweep (SLS) training. SLS training may be performed using a Beacon frame and/or a sector sweep (SSW) frame. When a Beacon frame is utilized, an access point (AP)/priority code point (PCP) may repeat the Beacon frame with multiple beams/sectors within each Beacon interval (BI) and multiple STAs may perform BF training simultaneously. An AP/PCP may not sweep all the sectors/beams within one BI, for example, due to the size of the Beacon frame. A STA may need to wait multiple BIs to complete initiator sector sweep (ISS) training and latency may be an issue. A SSW frame may be utilized for point to point BF training. A SSW frame may be transmitted using control PHY.

FIG. 4 is an exemplary SSW frame format. The exemplary SSW frame format may include one or more of a Frame Control field, a Duration field, an RA field, a TA field, a SSW field, a SSW Feedback field, or a FCS field.

FIG. 5 is an exemplary SSW field in a SSW frame. The exemplary SSW field may include one or more of a Direction subfield, a CDOWN subfield, a Sector ID subfield, a DMG Antenna ID subfield, or an RXSS Length subfield.

FIG. 6 is an exemplary SSW Feedback field in a SSW frame when transmitted as part of an ISS. The exemplary SSW Feedback field may include one or more of a Total Sectors in ISS subfield, a Number of RX DMG Antennas subfield, a first Reserved subfield, a Poll Required subfield, or a second reserved subfield.

FIG. 7 is an exemplary SSW Feedback field in a SSW frame when not transmitted as part of an ISS. The exemplary SSW Feedback field may include one or more of a Sector Select subfield, a DMG Antenna Select subfield, an SNR Report subfield, a Poll Required subfield, or a Reserved subfield.

Beam refinement may enable a STA to improve its antenna configuration (e.g., or antenna weight vectors) for transmission and/or reception. Beam refinement may include using one or more beam refinement protocol (BRP) packets to train the receiver and/or transmitter antenna. There may be two types of BRP packets: BRP-RX packets and BRP-TX packets.

Figure 8:
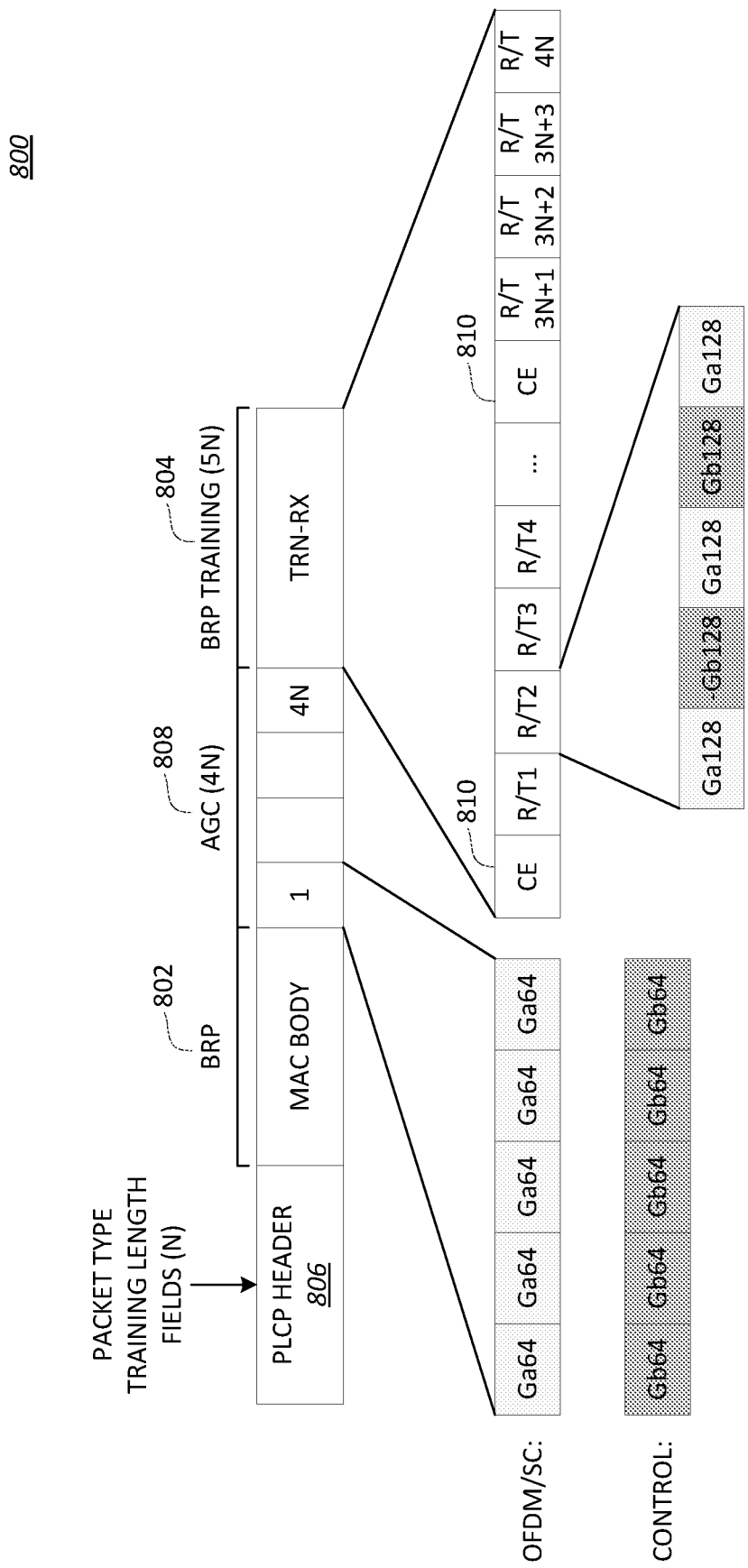
FIG. 8 is an exemplary physical layer convergence procedure (PLCP) protocol data unit (PPDU) which carries beam refinement protocol (BRP) frame and training (TRN) fields.

FIG. 8 is an exemplary physical layer convergence procedure (PLCP) protocol data unit (PPDU) 800 which carries a BRP frame 802 and one or more BRP training (TRN) fields 804. The exemplary PLCP PPDU 800 may include a PLCP Header 806 and/or one or more AGC fields 808. A BRP packet 802 may be carried by a directional multi gigabit (DMG) PPDU, for example, and may be followed by a training field that includes the AGC fields 808. The BRP packet 802 carried by a DMG PPDU may be followed by a transmitter or receiver training field, e.g., as shown in FIG. 8.

A value of N, as shown in FIG. 8, may be the Training Length given in the PLCP header 806. The Training Length may indicate that the automatic gain control (AGC) 808 has 4N subfields and that the TRN-R/T (e.g., BRP Training) field 804 has 5N subfields. The channel estimation (CE) subfield 810 may be the same as the CEF in the preamble, e.g., as shown in FIG. 2. The subfields in the beam training field may be transmitted using rotated $\pi/2$-BPSK modulation.

A BRP MAC frame may be an Action No ACK frame that includes one or more of the following fields: Category, Unprotected DMG Action, Dialog Token, BRP Request field, DMG Beam Refinement element, or Channel Measurement Feedback element 1 . . . Channel Measurement Feedback element k.

802.11ad may support four PHYs, including single carrier (SC) PHY, OFDM PHY, Control PHY, and low power SC PHY. The PHYs may share the same packet structure though the detailed designs for each field may be different.

FIG. 9 is an exemplary DMG PPDU 900. The exemplary DMG PPDU 900 may include one or more of a short training field 902, a channel estimation field 904, a header 906, a data field 908, or one or more TRN-R/T subfields 910.

Task Group ay (TGay) may introduce modifications to the IEEE 802.11 physical layers (PHY) and/or the IEEE 802.11 medium access control layer (MAC) that enables at least one mode of operation capable of supporting a maximum throughput of at least 20 gigabits per second (e.g., measured at the MAC data service access point), while maintaining or improving the power efficiency per station. TGay may introduce support for operations on license-exempt bands above 45 GHz while ensuring backward compatibility and coexistence with legacy directional multi-gigabit stations (e.g., as defined by IEEE 802.11ad-2012 amendment) operating in the same band. 802.11 ay may include mobility and/or outdoor support.

802.11 ay may operate in the same band as legacy standards and may include support for backward compatibility and coexistence with legacies in the same band. 802.11ay may include MIMO and channel bonding. In order to support MIMO transmission, multiple Phased Antenna Arrays (PAAs) or a PAA with multiple polarizations may be implemented in 802.11ay compatible devices.

An enhanced DMG (EDMG) Capability element may include the antenna polarization capability of an EDMG STA.

An EDMG STA may transmit a MIMO Setup frame (e.g., RTS or DMG CTS-to-self) prior to the transmission of a SU or MU MIMO PPDU. The MIMO Setup frame may indicate one or more destination STA(s) addressed by the PPDU.

A MIMO Setup frame (e.g., RTS) transmission may trigger a response (e.g., DMG CTS or ACK) from one or more destination STA(s).

FIG. 10 is an exemplary EDMG PPDU 1000. The exemplary EDMG PPDU 1000 may include one or more of an L-STF field 1002, an L-CEF field 1004, an L-Header 1006, an EDMG-Header-A 1008, an EDMG-STF field 1010, an EDMG-CEF field 1012, an EDMG-Header-B 1014, a data field 1016, an AGC field 1018, or a TRN field 1020.

Multiple polarizations and PAAs may be supported by EDMG devices for MIMO transmissions. Polarization capability may be signaled in the EDMG systems.

Polarization and antenna settings may be considered as implementations and may not be indicated explicitly in specifications. With mmW transmission in a dynamic or a semi-static environment and arbitrary relative position/orientation of a Tx-Rx pair, knowledge of polarization and antenna settings may help reduce analog/digital beamforming training overhead and/or increase the spectral efficiency.

Polarization and PAA selection may be utilized to increase power efficiency and/or reduce the feedback overhead (e.g., compared to other closed looped MIMO schemes). A number of RF frontends may be limited at transmitter and/or receiver sides. Polarization and PAA selection training may be performed for mmW systems.

Transmission with polarization may be signaled (e.g., since the transmitter and receiver may need to prepare the right polarization and/or antenna patterns towards each other).

With MIMO transmission, the number of data streams that can be supported may depend on the channel. Given the MIMO capability, a MIMO mode (e.g., scheme) to carry information may be selected. The MIMO mode selection and transmission may be explicitly signaled, for example, since analog beams may be set at the transmitter and receiver side to prepare the MIMO transmission.

Figure 11:
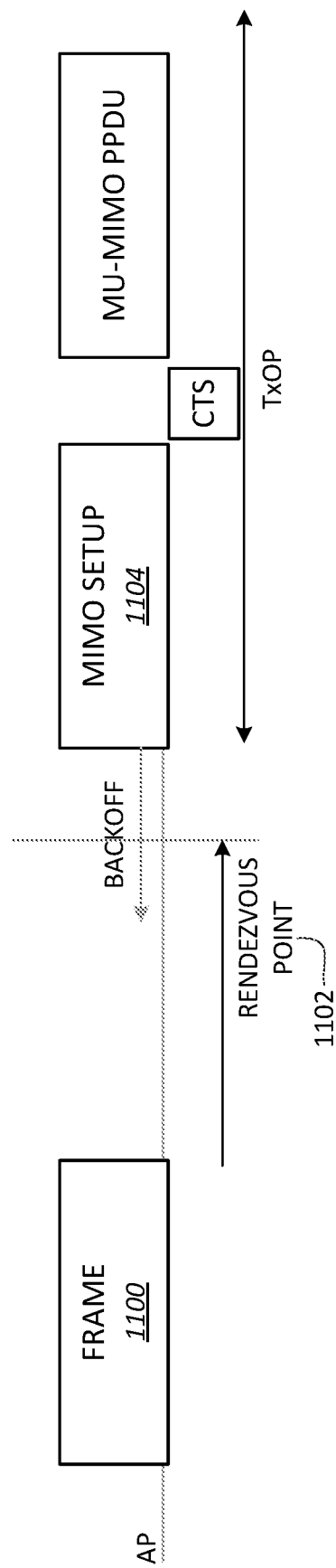
FIG. 11 is an exemplary MIMO setup frame.

FIG. 11 is an exemplary MIMO setup frame 1100. A MIMO setup frame 1100 may be used by an AP to setup a rendezvous point 1102 in advance such that a STA can start sending on a wider BW than the primary channel starting at the rendezvous point 1102. The STA may initiate a MIMO setup 1104, for example, in response to receipt of the MIMO setup frame 1100.

Figure 12A:
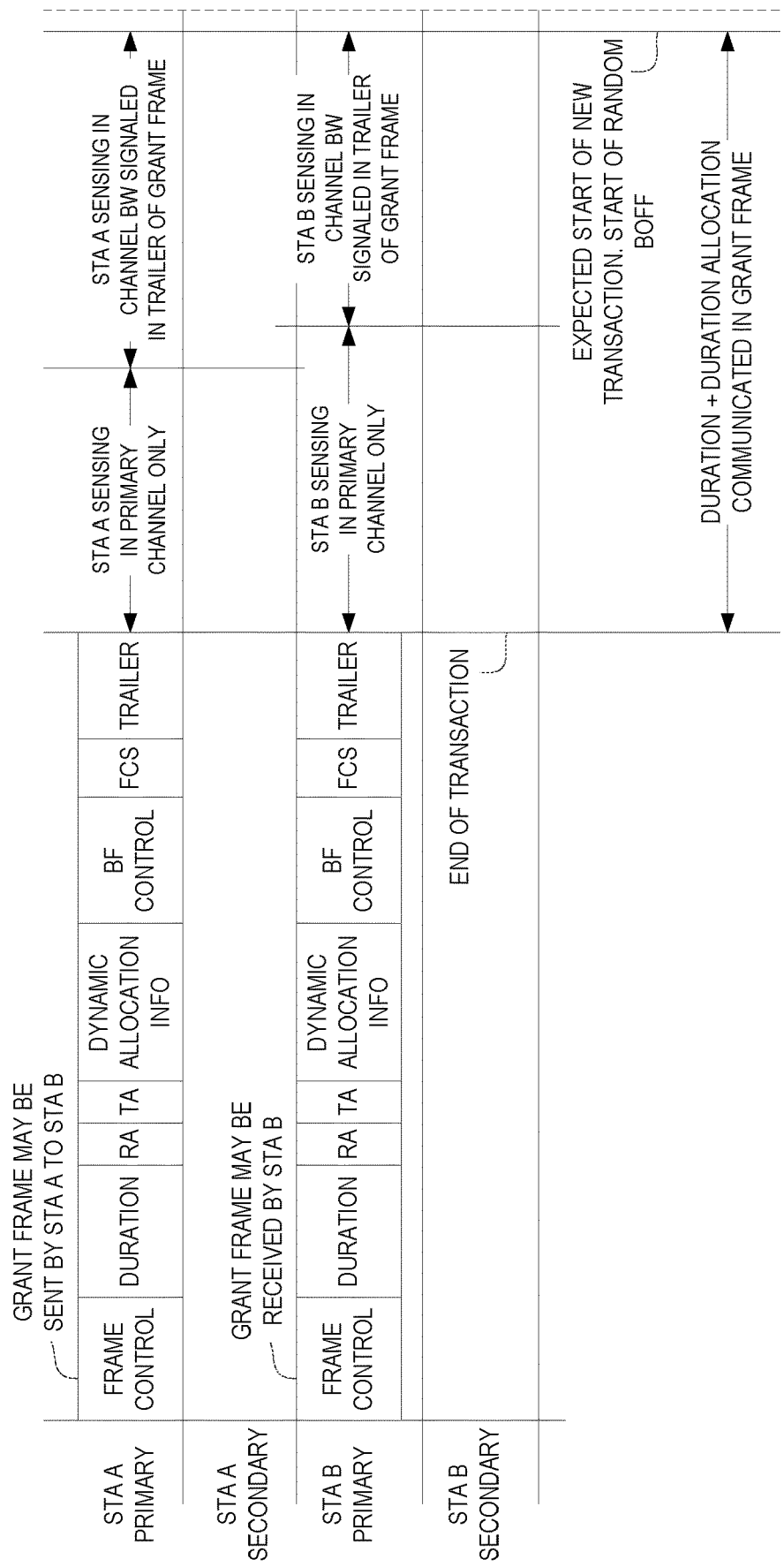
FIG. 12 is an exemplary signaling of a clear to send (CTS) frame idle bandwidth indication.
Figure 12B:
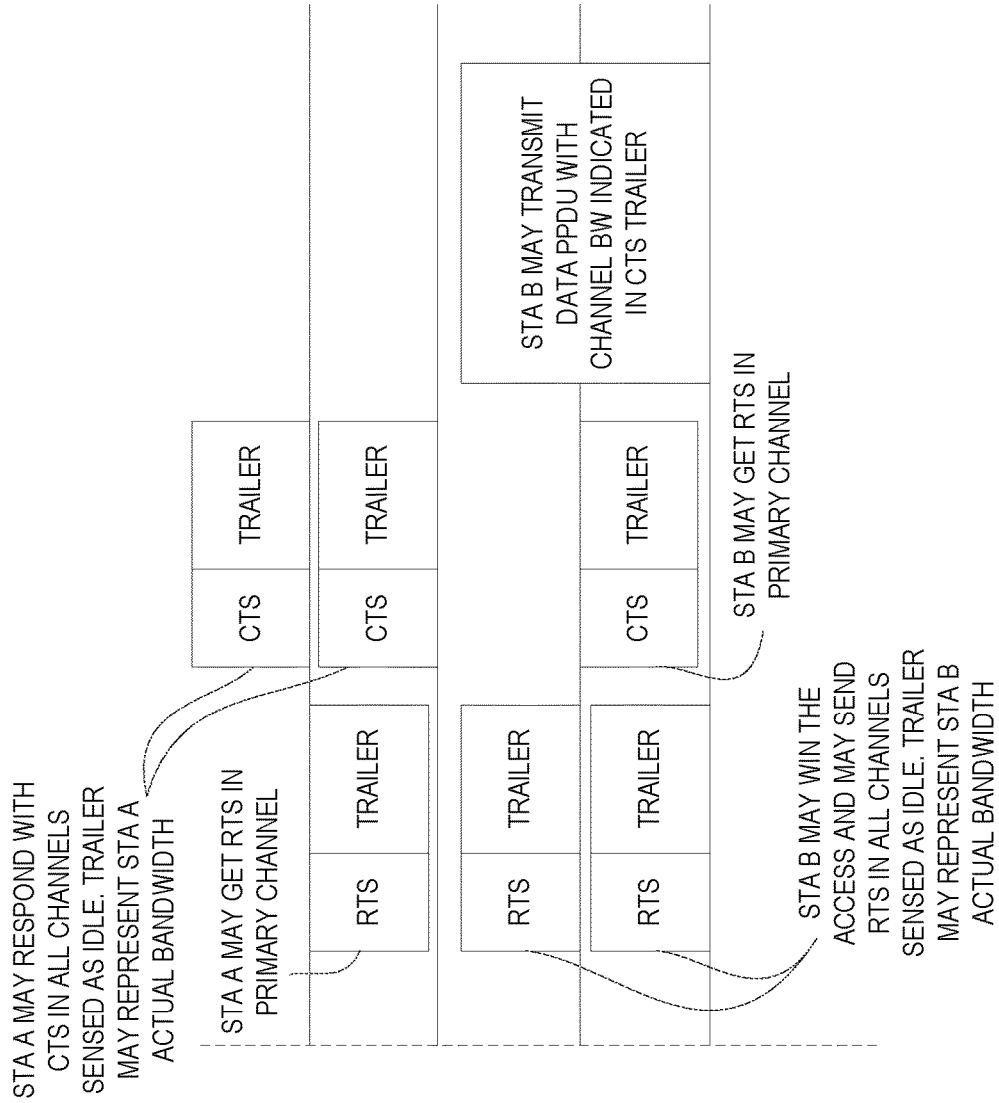

FIG. 12 is an exemplary signaling of a clear to send (CTS) frame idle bandwidth indication. One or more CTS frames with idle bandwidth indication signaled in a CTS frame trailer, may be sent if a primary channel is not busy. A CTS frame may need to be received at a primary channel at the RTS sender for the subsequent data transmission to follow.

The ready to send (RTS) receiver may receive an indication (e.g., in advance) to monitor multiple channels. The RTS receiver may receive an RTS frame on the secondary channel after the rendezvous point. When the RTS receiver receives the RTS frame on the secondary channel after the rendezvous point, the CTS may not be replied and data transmission may not occur.

Figure 13:
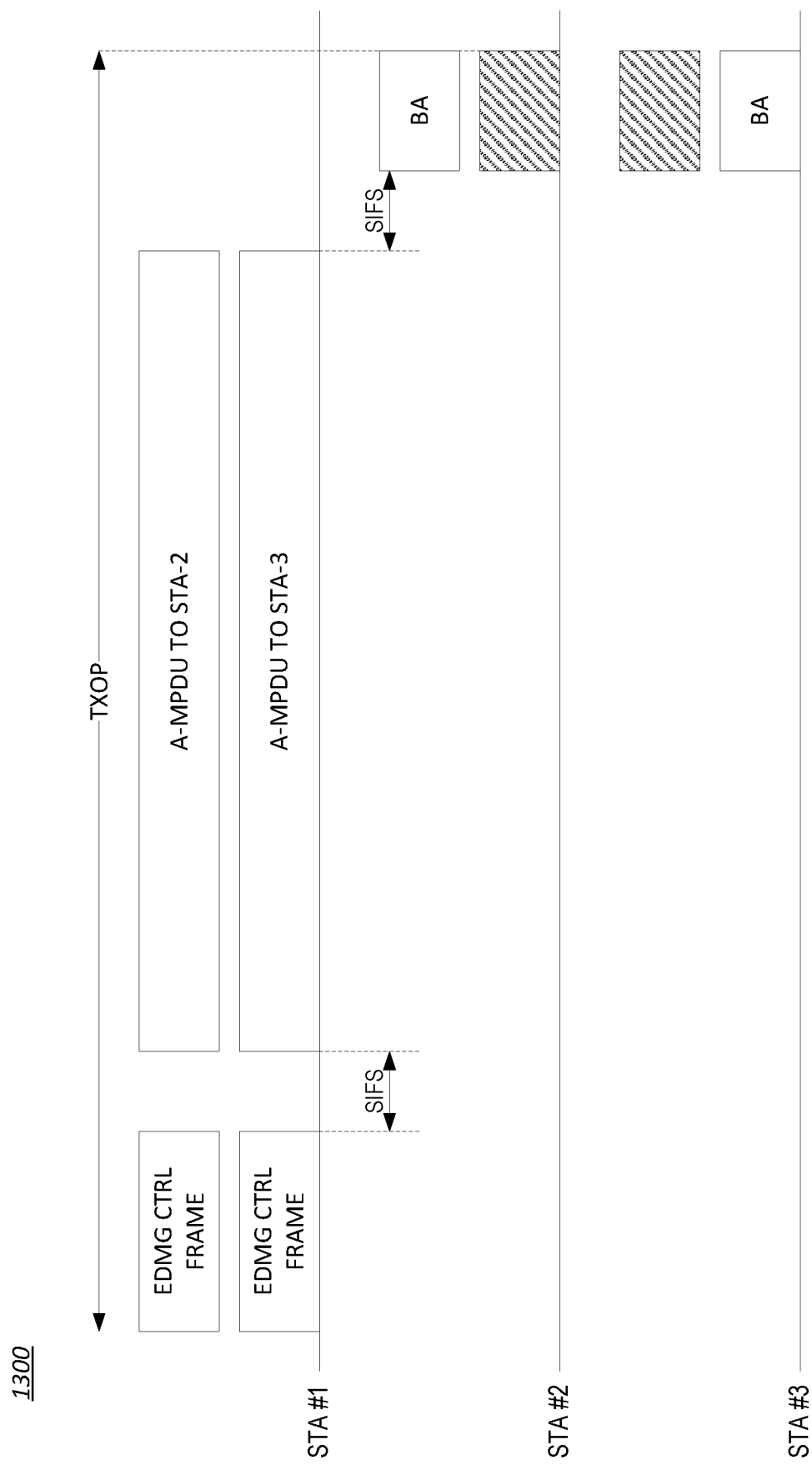
FIG. 13 is an exemplary aggregation of data from multiple downlink (DL) STAs.

An AP may aggregate data from multiple DL STAs on different channels. FIG. 13 is an exemplary aggregation 1300 of data from multiple DL STAs. STA #1 may be a STA AP. STA #1 may be connected to the backhaul. STA #1 may send aggregate data to send to STA #2 and STA #3. For example, STA #1 may simultaneously send data to STA #2 and STA #3.

A primary channel clear channel assessment (CCA) may be busy at a RTS receiver, but may not be busy at a RTS transmitter (e.g., the AP/PCP). Data may be sent to a STA on secondary channel, e.g., the RTS receiver may be STA #3 as shown in FIG. 13.

If a primary channel is left idle at the AP side, one or more STAs may initiate transmission to the AP during the time AP is transmitting to the RTS receiver (e.g. STA #3) on the secondary channel. The AP may not receive the transmission on the primary channel.

A STA may initiate a transmission to another STA (e.g., other than an AP) on the primary channel, for example, during the time the AP is transmitting to the RTS receiver (e.g., STA #3) on the secondary channel. The AP may not receive on the primary channel and may respect the transmit opportunity (TXOP) setting on the primary channel (e.g., after the transmission on the secondary channel finishes).

Polarization and/or PAA selection may be performed. Polarization may provide a MIMO channel with less spatial domain correlation. Polarization may not be signaled explicitly. When a number of antenna ports is greater (e.g., significantly greater) than a number of RF frontends, polarization information may be used to group the antenna ports and/or simplify the MIMO/BF training.

Polarization assisted analog beamforming training may be performed. For example, with the help of polarization info and/or limited channel information feedback, analog beam training with Tx/Rx beam pairing may be performed. The limited channel information feedback may include cross beam measurement feedback. Polarization info may reduce the measurements needed for analog beam training. For example, at the transmitter and receiver side, two polarizations may be supported, where each polarization may have N beams. An optimum beam selection may include going through all the combinations. Optimum beam selection may require $(2N)*(2N)$ measurements. When simultaneous receive training is applied, a receiver may form two beams to receive simultaneously and the number of measurements needed for beam selection may be reduced to $(2N)*N$. If polarization information is exchanged (e.g., before analog beamforming training), the number of measurements needed for beam selection may be reduced to less than or equal to 2N. The reduction of measurements may be based on good orthogonality and/or beam separation provided by polarized antennas. In an example, good beam separation may be roughly retained when the wireless channel is line of sight (LOS) dominant.

Figure 14:
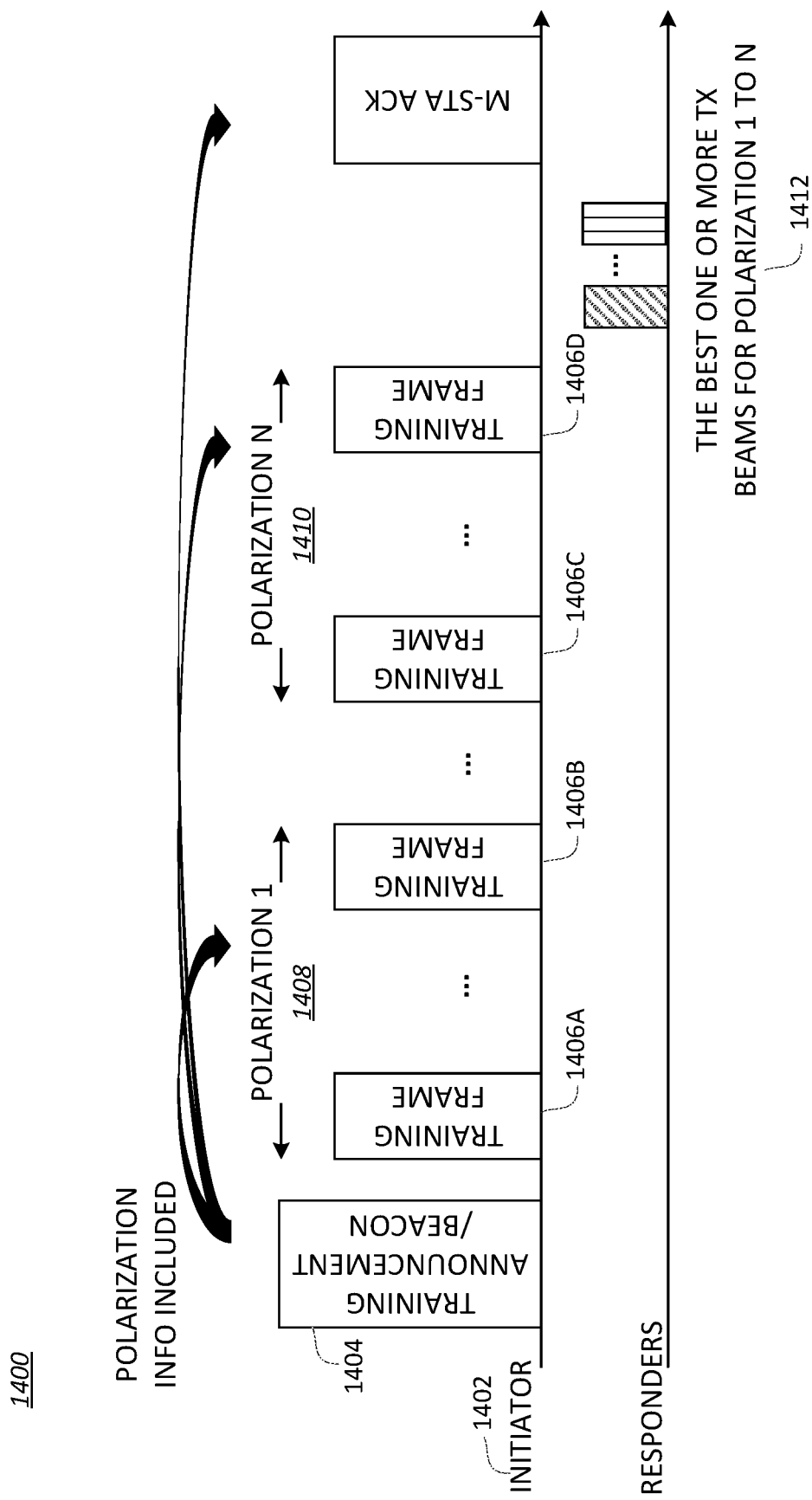
FIG. 14 is an exemplary polarization assisted analog beamforming training.

FIG. 14 is an exemplary polarization assisted analog beamforming training 1400. One or more of the following may apply.

An initiator 1402 may transmit a frame 1404 for training announcement. The training announcement frame 1404 may be an EDMG control frame which may be defined to set up EDMG BF training. The training announcement frame 1404 may be a management frame such as a Beacon frame. The training announcement frame 1404 may indicate a Number of PAAs to be trained. The training announcement frame 1404 may indicate a Number of polarizations to be trained. The training announcement frame 1404 may indicate a Number of beams to be trained. In one example, a number of beams per PAA per polarization may be signaled. In another example, a total number of beams which may be formed through the PAAs and polarizations may be signaled.

The responder may transmit a response frame. The response frame may acknowledge reception of the training announcement frame 1404. An indication of presence of the response frame may be signaled in the Beacon frame, Training Announcement frame 1404, and/or request frame in ATI etc.

The initiator 1402 may transmit one or more training frames 1406. The training frames 1406 may include Beacon frames, DMG SSW frames, EDMG extended SSW frames, and/or short SSW frames. The training frames 1406 may be transmitted with certain beam/sector patterns, for example, in a predefined order. For example, one or more beams may be formed based on a PAA order (e.g., first) and a polarization order (e.g., second). In an example, first N beams may be formed by the first PAA with a first polarization 1408 (e.g., polarization 1 shown in FIG. 14) and second N beams may be formed by the first PAA with a second polarization 1410 (e.g., polarization 2 shown in FIG. 14). A first set of the training frames 1406A, 1406B may be associated with the first polarization 1408. A second set of the training frames 1406C, 1406D may be associated with the second polarization 1410. After using the polarizations associated with the first PAA, one or more beams may be formed by a second PAA. In another example, the beams may be formed by polarization first and PAA second. The training frames 1406 may indicate a PAA index. The training frames 1406 may indicate a Polarization index.

The responder(s) may reply the best or the M best beams 1412. The training announcement frame 1404 may indicate how many beams the responder(s) should select during the training. For example, the parameter M may be indicated in the training announcement frame 1404, Beacon frame, and/or request frame in ATI etc.

Polarization information may be carried in frames which may be used to set up the analog BF training. For example, polarization information may be carried in a beacon frame, an announcement frame, a MIMO setup frame etc. Polarization information may be carried in each individual training frame (e.g., in case that the analog BF setup frames are not received by the receiver).

Polarization may include linear polarization, circular polarization, and/or mixed polarization. With linear and circular polarization, the polarization may be fixed. With mixed polarization, an antenna may support multiple polarizations simultaneously. When a number of RF frontends and/or a number of data streams to be transmitted is less than the number of polarizations, a polarization selection may be needed. Each polarization supported may be considered as a virtual antenna and the polarization selection may be similar for each polarization type. The PAAs may be utilized in many communication systems, such as 802.11 ay, for example. PAA selection may be performed when the number of RF frontends and/or the number of data streams to be transmitted is less than the number of PAAs. PAAs may be considered as virtual antennas.

A virtual antenna may represent antenna polarization, PAA configuration, and/or other type of antennas. A PAA configuration may include a PAA index and/or a PAA order.

Virtual antenna selection may be part of analog beamforming training where beams may be formed from different polarizations, PAA configurations may be transmitted, and/or one or more best beams may be selected.

Virtual antenna selection may be performed after analog antenna training. Virtual antenna selection may be performed implicitly, for example, with information collected after analog antenna training.

Virtual antenna selection may be viewed as a mapping between RF frontends/chains to virtual antennas (e.g., such as PAA configurations, polarizations, etc.).

Virtual Antenna Selection (VAS) may be performed explicitly or implicitly (e.g., antenna reciprocity may be assumed).

With explicit VAS, the initiator (e.g., STA1) may transmit a frame with sounding/training sequences transmitted by each AVS sequentially. Each sequence may be transmitted with the VAS associated with different combinations. For example, to train 4 virtual antennas, STA1 may transmit a training sequence 4 times with different antenna rotation combinations, respectively. In an example, a P matrix may be used to rotate and combine the signals. The frame may be a null data packet (NDP) frame with a NDP announcement frame transmitted xSIF time before. The frame may be a NDP frame where the Header field may be overwritten to indicate an NDP frame for VAS.

The responder (e.g., STA2), upon reception of the training frame, may transmit a feedback frame. The feedback frame may indicate one or more best virtual antennas. The feedback frame may indicate an intention to perform receive virtual antenna selection. When the responder performs receive virtual antenna selection, the transmitter may add one or more training fields for receive antenna selection and/or signal the transmit virtual antenna setting (e.g., including PAA and polarization information) explicitly, for example, such that the receiver may select one or more corresponding receive antennas, e.g., without training or with limited training.

STA1 (e.g., based on the feedback from STA2) may perform VAS at the transmitter side. STA1 may signal a VAS setting before MIMO transmission in a MIMO setup frame, or other control/management frames. Signaling of a VAS setting may be sent together with the MIMO data transmission in the PLCP header.

Beam Refinement Protocol (BRP) may enable receiver training, for example, in 802.11ad. BRP may iteratively train the transmitter and receiver sides to improve on the values determined during the SLS. With antennas with the capability to adjust polarization direction, the BRP may be extended to include refining the polarization or be replaced by polarization refining. Polarization Refinement Protocol (PRP) may be part of an existing BRP or separate from BRP, e.g., PRP may occur before or after the BRP.

Figure 15A:
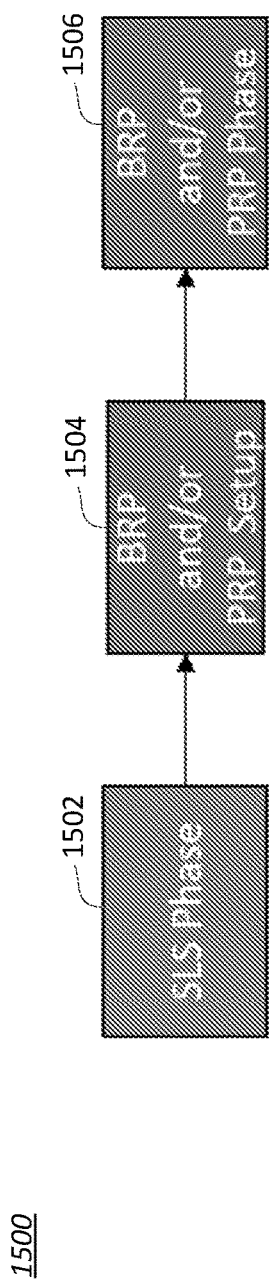
FIG. 15A is a flow chart depicting an exemplary polarization refinement protocol (PRP) as part of an existing BRP.

FIG. 15A is a flow chart depicting an exemplary PRP 1500, e.g., as part of an existing BRP. The exemplary may begin with a SLS Phase 1502. The SLS Phase 1502 may be followed by a BRP and/or PRP Setup 1504. The BRP and/or PRP Setup 1504 may be followed by a BRP and/or PRP Phase 1506.

Figure 15B:
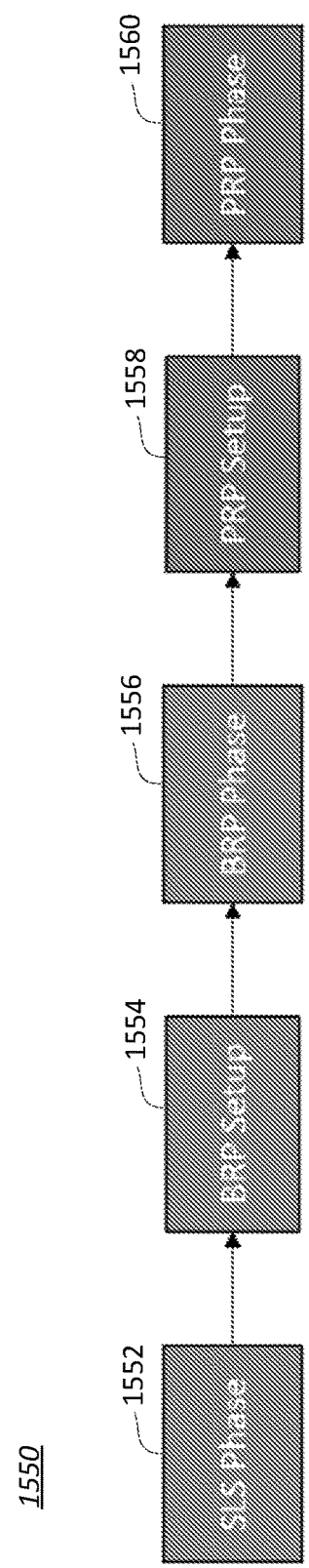
FIG. 15B is a flow chart depicting an exemplary PRP after the existing BRP.

FIG. 15B is a flow chart depicting an exemplary PRP 1550, e.g., PRP takes place after the BRP. The exemplary PRP 1550 may include (e.g., begin with) a SLS Phase 1552. The SLS Phase 1552 may be followed by a BRP Setup 1554. The BRP Setup 1554 may be followed by a BRP Phase 1556. The BRP Phase 1556 may be followed by a PRP Setup 1558. The PRP Setup 1558 may be followed by a PRP Phase 1560.

In 802.11ad, BRP may include a setup phase and/or a beam refinement phase, for example, based on a request-response protocol. One or more request-response packets may be exchanged, for example, until the responder (e.g., receiver) sets the capability-request field in the BRP packet to 0. The initiator (e.g., transmitter) may respond with the capability-request field set at 0. When the PRP is part of an existing BRP, setting capability-request field at 0 may indicate completion of BRP and/or PRP. When the PRP is performed after the BRP, setting capability-request field may need to be done twice, for example, to indicate the completion of BRP and PRP.

A MIMO transmission may include one or more polarizations. A MIMO transmission in a mmW communication system may include multiple data streams and/or multiple RF chains. Each RF chain may correspond to a PAA configuration, a polarization, or a polarization in a PAA configuration, etc. With mmW communication, hybrid beamforming may be applied. A virtual channel seen at the baseband may be a channel after analog beamforming. Channel separation may depend on the analog beamforming and/or properties of physical antenna elements. Channel separation for a MIMO transmission in a mmW communication system may be different than channel separation in a sub 6 GHz transmission. Antennas with dual polarization may provide good MIMO channels with orthogonal (e.g., almost orthogonal) analog beams/channel separation. For example, based on a mmW channel propagation property, with LOS and/or a LOS dominant channel, orthogonality may be maintained at the receiver side. With LOS and/or a LOS dominant channel scenario, a MIMO transmission may be optimized, for example, without knowing detailed CSI information.

With an open loop multiple data stream transmission, distributing signals over all the virtual antennas, including all polarizations and/or PAAs, may result in poor performance.

Multiple data streams may be parsed and/or assigned to different polarization, e.g., before PAA assignment/selection (e.g., polarization mapping). When multiple PAAs are available for each polarization, the data stream(s) may be expanded to multiple PAAs using one or more spatial schemes (e.g., PAA/spatial mapping/selection). The one or more spatial schemes may include open loop precoding, closed loop precoding, CSD, and/or space-time coding. When a virtual antenna/PAA/polarization selection scheme is applied, virtual antennas with the same or similar polarization directions may be grouped. Different data streams may be assigned to different groups, for example, corresponding to different polarizations. Virtual antenna selection (e.g., PAA/spatial mapping) may be performed within each group (e.g., intra group selection). One or more best virtual antennas may be selected for each group.

Figure 16:
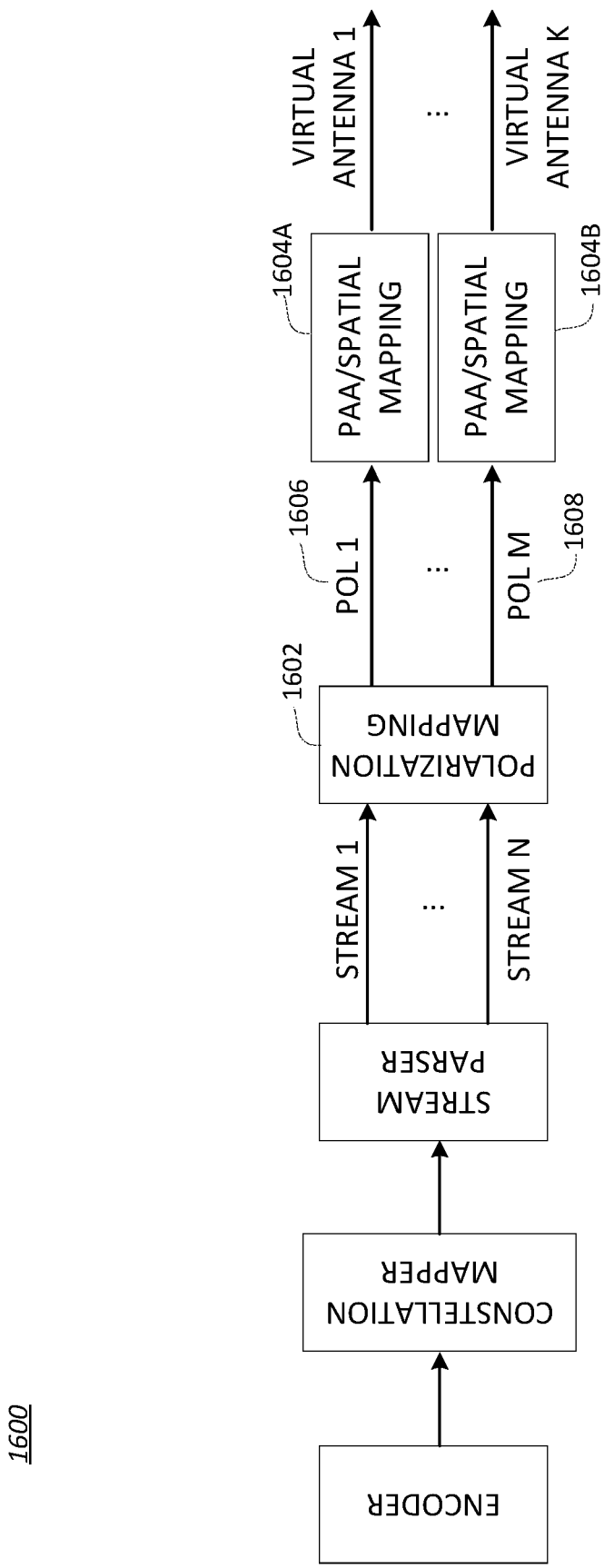
FIG. 16 is an exemplary spatial mapping for an open loop multiple data stream transmission.

FIG. 16 is an exemplary spatial mapping 1600 for an open loop multiple data stream transmission. The exemplary spatial mapping 1600 may include a polarization mapping 1602 and a PAA/spatial mapping 1604. In the polarization mapping 1602, N streams may be mapped to M polarizations. When N=M, the polarization mapping 1602 may be a one-to-one mapping. When N<M, one or more streams may be mapped to more than one polarization. When N>M, more than one stream may be mapped to one or more polarizations and the streams may need to be separated further by a PAA/spatial mapping 1604. PAA/spatial mapping 1604 may be applied for each polarization. For example, a first PAA/spatial mapping 1604A may be performed for a first polarization 1606. A second PAA/spatial mapping 1604B may be performed for a second polarization 1608. PAA/spatial mappings 1604A, 1604B may be independent from the first polarization 1606 to the second polarization 1608. A joint PAA mapping may be applied to the polarizations. M polarizations may be mapped to K virtual antennas, where K>=max(M,N).

One or more (e.g., 4) RF chains may transmit via two PAAs. Each PAA may support dual polarization. For example, the one or more RF chains may be mapped to four virtual antennas (PAA1, Pol1), (PAA1, Pol2), (PAA2, Pol1), and (PAA2, Pol2), where Polx may refer to polarization direction x. For example, Pol1 may represent a vertical polarized direction and Pol2 may represent a horizontal polarized direction.

Figure 17:
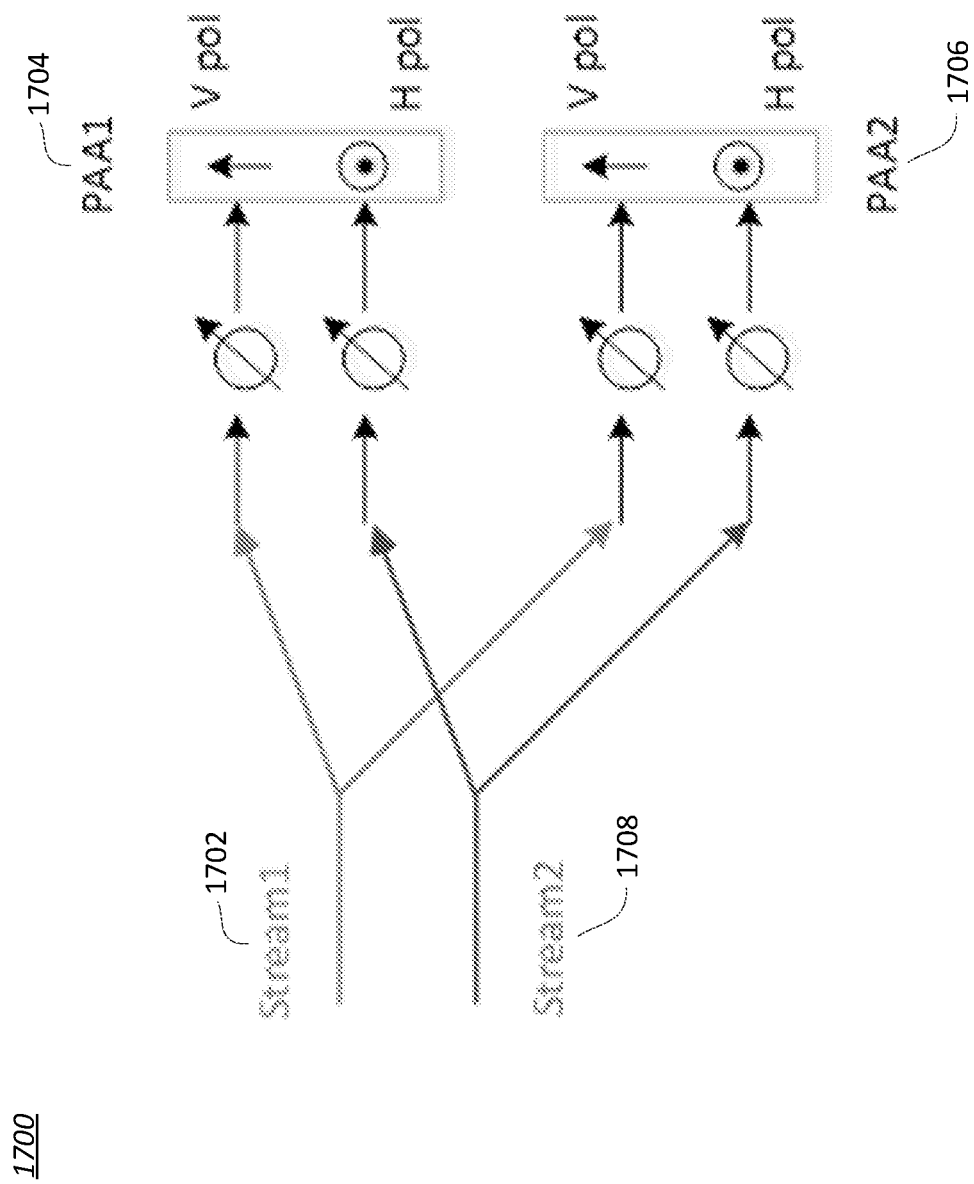
FIG. 17 is an exemplary open loop baseband MIMO transmission with polarization.

FIG. 17 is an exemplary open loop baseband MIMO transmission 1700 with polarization. One or more of the following may be performed for an open loop two or more data stream transmission. A stream parser may split a coded bit stream to two or more bit streams. A coded bit stream may be generated for example, after padding, scrambler encoding, and/or LDPC encoding. For each bit stream, a constellation mapper may map bits to constellation symbols, for example, after the stream parser. The stream parser may split a stream in the symbol domain after constellation mapping. A first symbol stream 1702 (e.g., Stream1) may be transmitted over a first PAA 1704 polarized in the vertical direction (e.g., PAA1, V) and a second PAA 1706 polarized in the vertical direction (PAA2, V). A second symbol stream 1708 (e.g., Stream2) may be transmitted over the first PAA 1704 polarized in the horizontal direction (PAA1, H) and the second PAA 1706 polarized in the horizontal direction (PAA2, H) as shown in FIG. 17. Open loop precoding may be applied on each data stream, e.g., to expand the signal to two spatial domain signals. An open loop precoding matrix applied to Stream1 1702 may be represented as $(W_{11}\ w_{12})^T$. An open loop precoding matrix applied to Stream2 1708 may be represented as $(w_{21}\ W_{22})^T$. Stream2 1708 may be phase rotated before or after applying the open loop precoding matrix. A precoding weight associated with Stream1 1702 may be orthogonal to a precoding weight associated with Stream2 1708. One or more other space time schemes (e.g., CDD, Alamouti, etc.) may be applied to expend a stream to two antennas. Power allocation and/or MCS allocation may be applied with the MIMO scheme. Unequal power/MCS may be applied to spatial streams.

A two data stream transmission may include antenna selection. Antenna selection may be based on a partial CSI. When compared with full CSI, partial CSI may require less feedback overhead, e.g., in an explicit sounding case, with feedback. When compared with full CSI, partial CSI may require less frequent training sequences, e.g., in an implicit sounding case, using channel reciprocity. Virtual antenna selection may be based on antenna realization (e.g., PAA information and/or polarization information).

Figure 18:
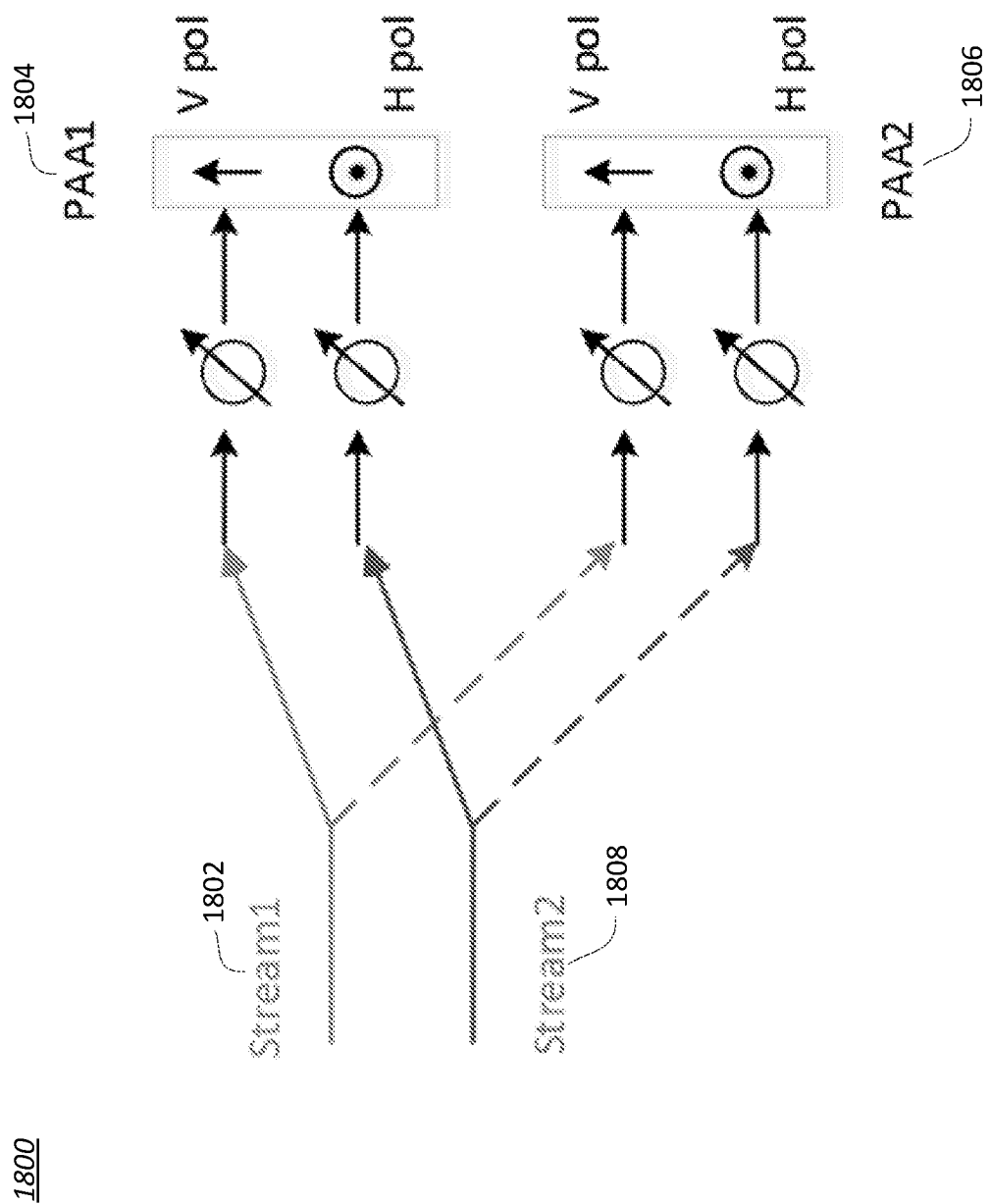
FIG. 18 is an exemplary data stream MIMO transmission with a per-polarization antenna selection.

FIG. 18 is an exemplary data stream MIMO transmission 1800 with a per-polarization antenna selection. Virtual antenna selection may be performed using a per polarization selection. As shown in FIG. 18, a first spatial stream 1802 (e.g., Stream1) may be mapped to one or more vertical virtual antennas and a second spatial stream 1808 (e.g., Stream2) may be mapped to one or more horizontal virtual antennas. A STA may select a virtual antenna for Stream1 1802 from a vertical virtual antenna of a first PAA 1804 (e.g., PAA1, V pol) and a vertical virtual antenna of a second PAA 1806 (e.g., PAA2, V pol). The virtual antenna selection may be based on partial CSI. The partial CSI may be collected at the transmitting STA side. In explicit sounding, the partial CSI may be fed back from the receiving STA to the transmitting STA. With implicit sounding scenario, the partial CSI may be estimated at the transmitting STA side, for example, using a frame transmitted from the receiving STA to the transmitting STA. The frame may carry sounding sequences. The partial CSI may include the absolute value of channel response, RSSI, SNR, and/or SINR. A STA may select a virtual antenna for Stream2 1808 from a horizontal virtual antenna of the first PAA 1804 (e.g., PAA1, H pol) and a horizontal virtual antenna of the second PAA 1806 (e.g., PAA2, H pol).

Virtual antenna selection may be performed without a polarization restriction. In such examples, polarization information may not be used for antenna selection.

Power allocation and/or MCS allocation may be applied with MIMO. An unequal power and/or MCS may be applied to spatial streams.

Figure 19:
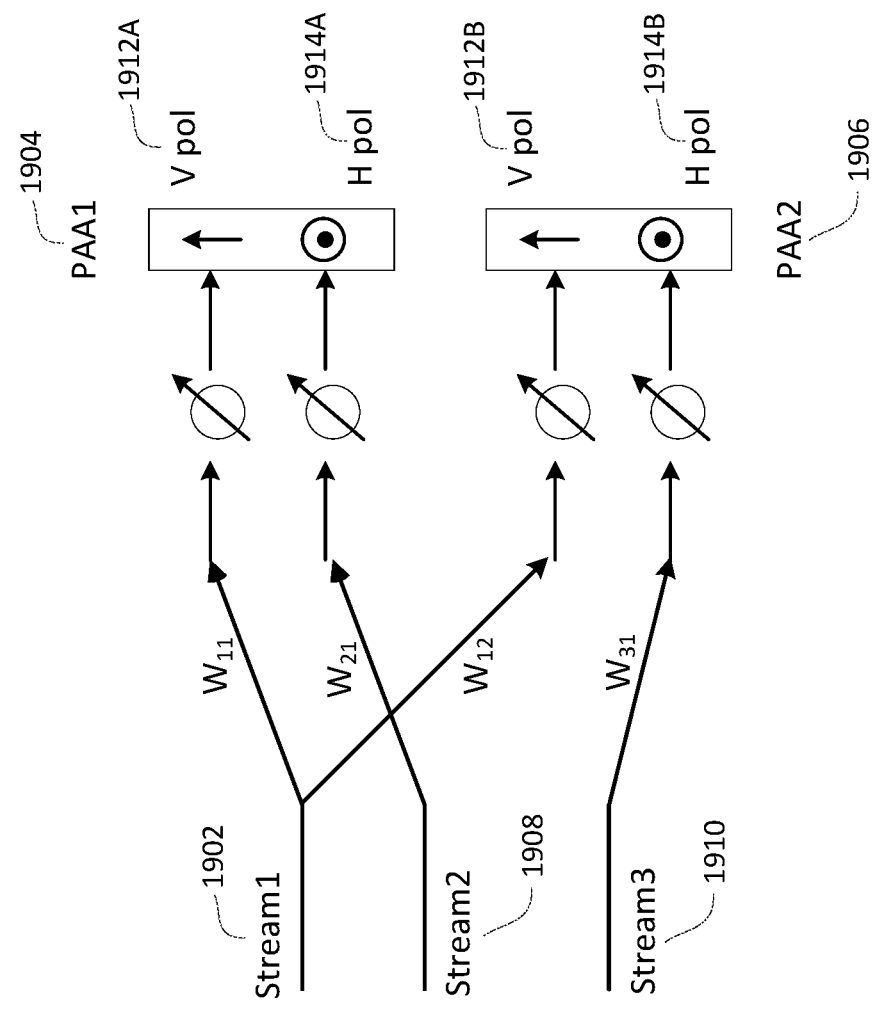
FIG. 19 is an exemplary open loop baseband three data stream MIMO transmission with polarization.

FIG. 19 is an exemplary open loop baseband three data stream MIMO transmission 1900 with polarization. A first stream, such as Stream1 1902, may be transmitted over the vertical polarizations (e.g., of PAA1 1904 and PAA2 1906). For example, Stream1 1902 may be mapped to the vertical polarization 1912A of PAA1 1904 and the vertical polarization 1912B of PAA2 1906. A second stream, such as Stream2 1908, and a third stream, such as Stream3 1910, may be transmitted over the horizontal polarization, for example, of PAA1 1904 and PAA2 1906, respectively. Stream2 1908 and Stream3 1910 may be mapped (e.g., directly mapped) to the two virtual antennas with different weights (e.g., $W_{21}$ and $W_{31}$). For example, Stream2 1908 may be mapped to the horizontal polarization 1914A of PAA1 1904. Stream3 1910 may be mapped to the horizontal polarization 1914B of PAA2 1906. A 2×2 unitary matrix may be applied to Stream2 1908 and Stream3 1910, which may result in respective symbols. The respective resulting symbols may be mapped to two horizontal polarized virtual antennas.

Figure 20:
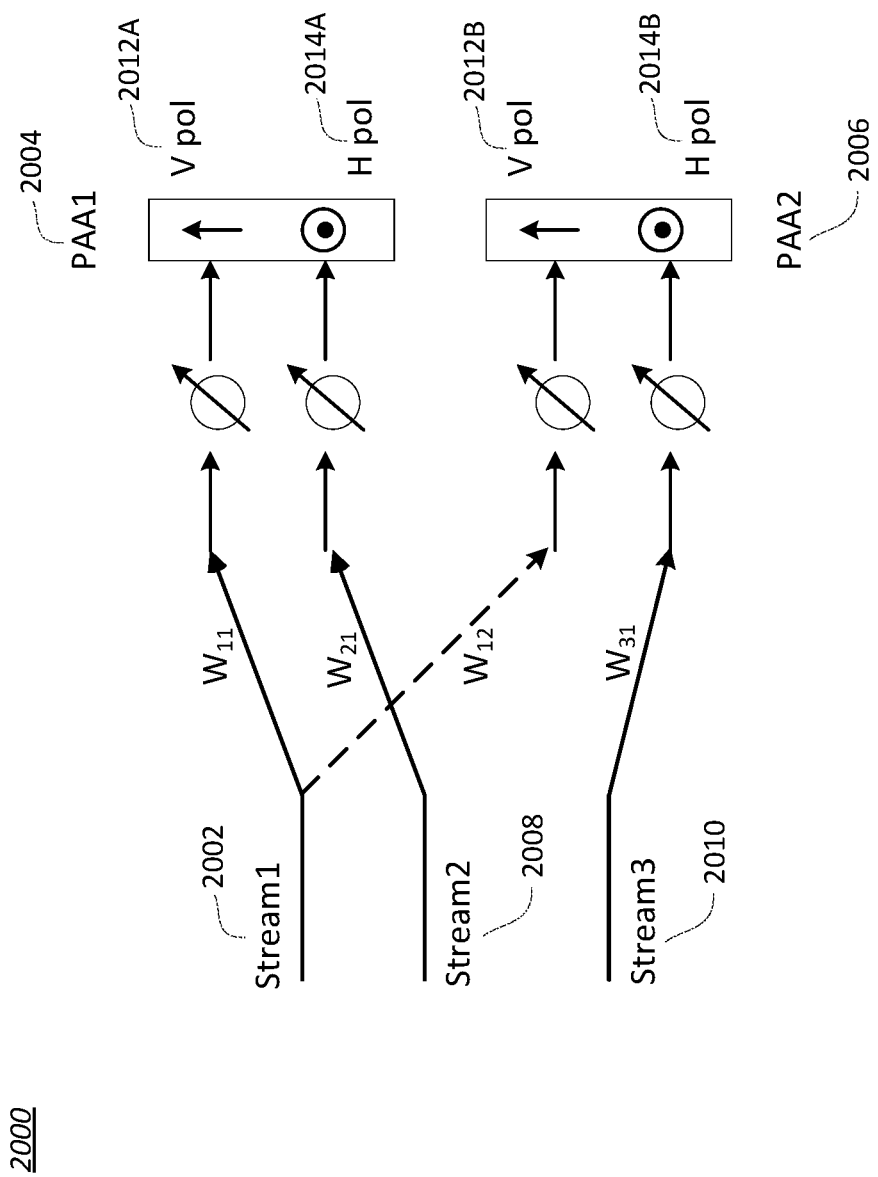
FIG. 20 is an exemplary open loop baseband three data stream MIMO transmission with antenna selection.

FIG. 20 is an exemplary open loop baseband three data stream MIMO transmission 2000 with antenna selection. As shown in FIG. 20, antenna selection may be performed in a three stream transmission. The example open loop baseband three data stream MIMO transmission 2000 shown in FIG. 20 may include antenna group selection and intra group antenna/spatial scheme selection. Antennas may be grouped based on polarization information. A first group may include vertical polarized antennas and a second group may include horizontal polarized antennas. For example, the first group (e.g., Group 1) may include a first vertical polarized antenna 2012A of PAA1 2004 (e.g., PAA1, V) and a second vertical polarized antenna 2012B of PAA2 2006 (e.g., PAA2, V). The second group (e.g., Group 2) may include a first horizontal polarized antenna 2014A of PAA1 2004 (e.g., PAA1, H) and a second horizontal polarized antenna 2014B of PAA2 2006 (e.g., PAA2, H). The STA may perform group selection before antenna selection. Group selection may include selecting a group based on intra group spatial separation. Intra group spatial separation may be measured using rank, condition number, etc. For example, group 2 may have better spatial separation than group 1. Two streams may be transmitted over group 2 and one stream may be transmitted over group 1, for example, when group 2 has better spatial separation than group 1. The STA may choose an antenna and/or spatial scheme for each group. For example, the STA may perform antenna selection in group 1. Stream1 2002 may be transmitted over the antennas in group 1 using another spatial scheme, e.g., such as Alamouti, CDD, or closed loop precoding. For group 2, Stream2 2008 and stream3 2010 may be mapped (e.g., directly mapped) to the two virtual antennas with different weights (e.g., $W_{21}$ and $W_{31}$). A 2×2 unitary matrix may be applied to Stream2 2008 and Stream3 2010, which may result in respective symbols. The respective resulting symbols may be mapped to two horizontal polarized virtual antennas. Power allocation and/or MCS allocation may be applied with MIMO. An unequal power and/or MCS may be applied to spatial streams.

A baseband transmission may be specified and/or signaled (e.g., explicitly), e.g., so that a receiver may prepare the receive beams accordingly. The use of the baseband transmission may be signaled in a PLCP header and/or a control/management frame. The control/management frame may be used to schedule and/or setup a MIMO transmission. The control/management frame may be included in a MAC header of a frame.

A transmitter may transmit one or more streams and/or layers. A stream may be associated with multiple weights. The transmitter may transmit multiple streams via multiple power amplifiers (PAs). The transmitter may transmit streams using all the weights via all power amplifiers or the transmitter may transmit streams using each weight via a corresponding power amplifier. For example, the transmitter may transmit a first stream (e.g., all weights associated with the one stream) via one power amplifier. In another example, the transmitter may transmit a first weight of a first stream via a first power amplifier and may transmit a second weight of the first stream via a second power amplifier.

Figure 21:
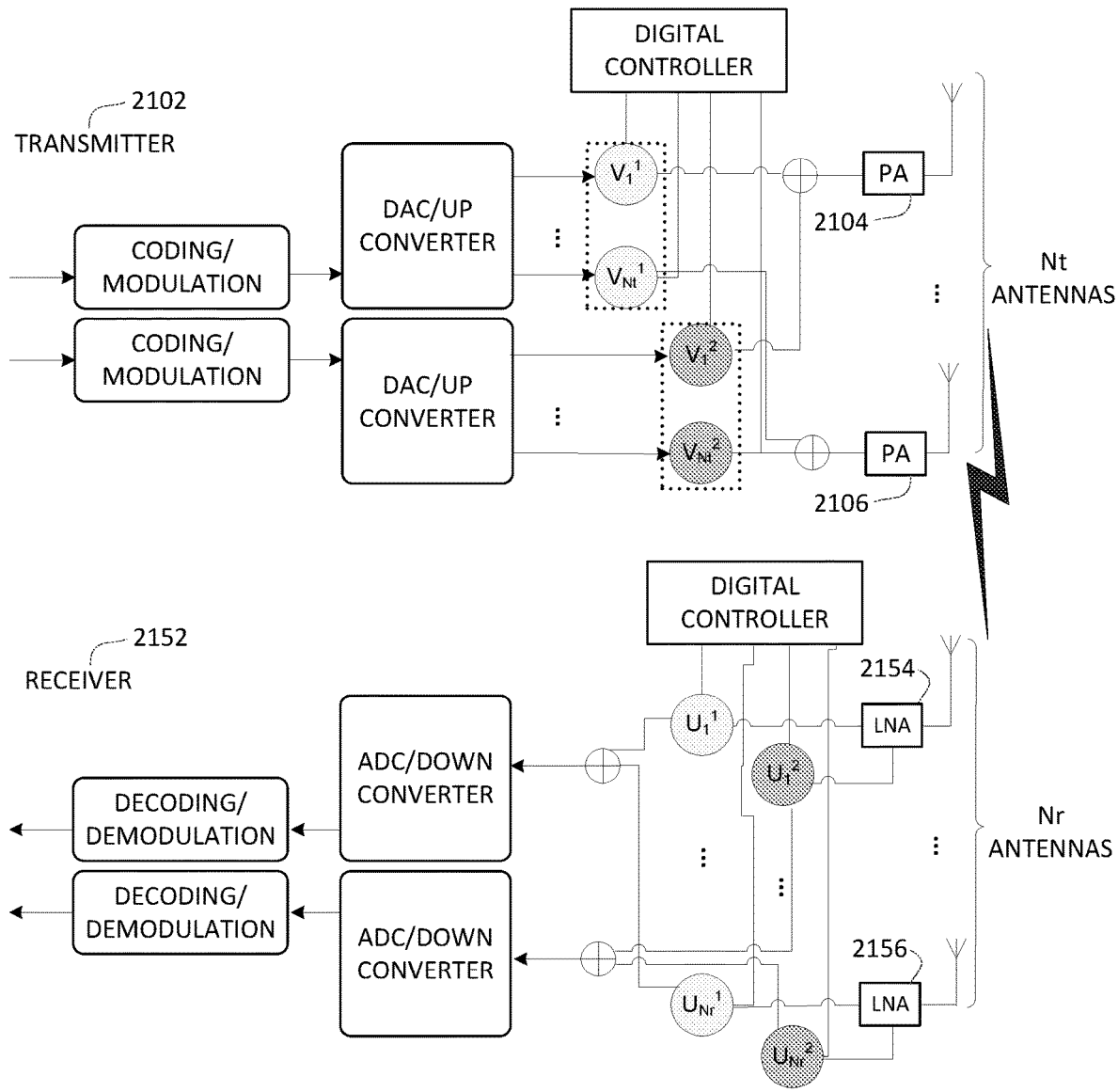
FIG. 21 is an exemplary analog architecture where all power amplifiers (PAs) are excited by all weights.

FIG. 21 is an exemplary analog architecture where all PAs are excited by all weights. A transmitter 2102 may send multiple streams that may have different weights via two or more PAs (e.g., such as PAs 2104, 2106). For example, each PA may be used to send the multiple streams. PA 2104 and PA 2106 may each be excited by the different weights of the multiple streams. A receiver 2152 may receive the one or more streams (e.g., signals that include the streams) via two or more low-noise amplifiers (LNAs) (e.g., such as LNAs, 2154, 2156).

Figure 22:
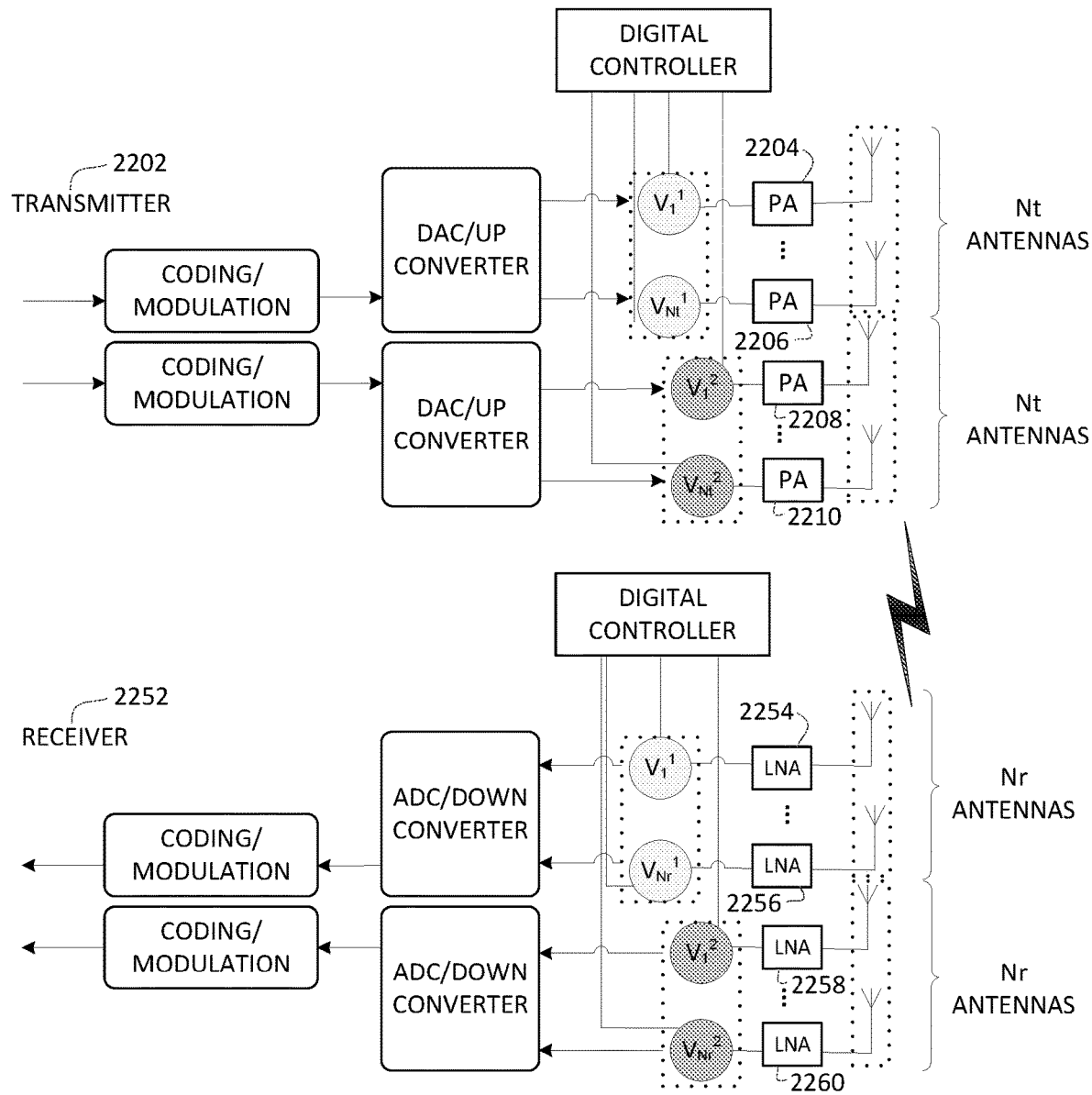
FIG. 22 is an exemplary analog architecture where different PAs are excited by separate weights.

FIG. 22 is an exemplary analog architecture where different PAs are excited by separate weights. A transmitter 2202 may send streams with different weights via separate PAs. For example, a first weight of a first stream may be sent via a first PA 2204. A second weight of the first stream may be sent via a second PA 2206. A third weight of a second stream may be sent via a third PA 2208. A fourth weight of a second stream may be sent via a fourth PA 2210. A receiver 2252 may receive streams with different weights via separate LNAs. For example, each LNA may be configured to receive a signal having a certain weight. A first weight of a first signal may be received via a first LNA 2254. A second weight of the first signal may be received via a second LNA 2256. A third weight of a second signal may be received via a third LNA 2258. A fourth weight of a second signal may be received via a fourth LNA 2260. The received signal may be represented as y=Hx, where y is a vector, H is a matrix, and x is a vector associated with the transmit streams. Each element of x may correspond to the transmit stream. Each element of y may include a linear combination of the transmit streams, x, due to the matrix, H.

A transmitter and a receiver may use a beam search algorithm such as an enhanced sector level sweep procedure (eSLS) or an enhanced beam refinement procedure (eBRP), for example, to identify one or more best transmit/receive beam pairs between the transmitter and the receiver. The beam pairs may be fixed and data streams may be transmitted on the separate beam-pairs.

A number of beam pairs may be fixed and may be equal to the maximum number of streams allowed (e.g., $N_{sts}$=2 for 802.11ay).

A number of beam pairs may be equal to a maximum number of streams allowed. The transmitter and receiver may dynamically change the beam pairs used (and number of streams sent), for example, based on a fade out of the channel associated with the beam pair (e.g., due to blockage for example).

A number of beam pairs may be greater than a maximum number of streams allowed with the transmitter and receiver dynamically selecting one or more best beam pairs for transmission based on the quality of the channel associated with the beam pair and/or the MIMO transmission mode.

A generalized model of the transmission phase may be represented as:

$$y = H \cdot F_{RF} \cdot F_{BB} \cdot x$$

where y is the received signal before any receiver processing, H is the channel, $F_{RF}$ is the analogue precoder, $F_{BB}$ is the baseband precoder, and x is the transmitted signal. The baseband precoder may be a diagonal matrix where the entries of the diagonal correspond to the amount of energy placed on a set of analog weights (e.g., based on the analog architecture).

The baseband precoder may be represented as $$y = H[\, fa_1 \; \ldots \; fa_n\,] \begin{bmatrix} fd_1 & 0 & 0 \\ 0 & \ddots & 0 \\ 0 & 0 & fd_n \end{bmatrix} \begin{bmatrix} x_1 \\ \vdots \\ x_n \end{bmatrix} \frac{1}{\sqrt{\sum |fd_i|^2}}$$

where $fa_1$ is a vector representing the ith analogue beam of the RF precoder ($F_{RF}$) preselected by the eSLS or eBRP, $fd_i$ is a scalar representing the amount of energy placed on the ith beam (e.g., as there is no baseband precoder), x is the data stream on the ith beam, n is the total number of beams, and $$\frac{1}{\sqrt{\sum |fd_i|^2}}$$

is a power normalization factor. n may be greater than a total number of streams which may imply that a beam selection may be implemented. Diversity transmission may not be considered in an analog model.

One or more modes may be used, e.g., used for transmission. The modes may include open-loop transmission, beam selection, and/or beam loading.

An Open Loop mode may be used for transmission. In open loop transmission, the elements of the baseband precoder may be represented as, $$fd_i = 1, \; i=1, \ldots n$$

In open loop transmission, data may be transmitted on all beams which may require no beam state information at the transmitter or feedback from the receiver. Gain may be limited based on a correlation between beams and/or by unequal beam power levels (e.g., due to fading of beams from blockage).

Beam Selection may be performed. In beam selection (e.g., in which the beams may be based on antenna, polarization, physical Antenna Array, and/or Antenna panels), the elements of the baseband precoder may be represented as:

$$fd_i = f(x) = \begin{cases} 0, & \text{beam } i \text{ is not selected} \\ 1, & \text{beam } i \text{ is selected} \end{cases}$$

The power on beams that are not selected may be set to zero. A selected beam may have full power transmission. Beam state information at the transmitter or feedback from the receiver may be required, for example, to identify the beams that should be transmitted on. An amount of channel state information (CSI) may be limited. An amount of feedback may be limited.

The feedback per beam may be a binary number. The binary number may indicate whether a beam should be used.

The feedback per beam may be a desired metric such as SNR, SINR, or RSSI. The transmitter may use the feedback per beam to determine whether a beam should be selected.

Beam selection may be used to switch the transmission to one or more best beams (e.g., in the case that the maximum number of space time streams are always sent). Beam selection may be used to switch off a beam that may perform poorly if sent. For example, the power used to send information on the non-selected beam may be transferred to the selected beams. The baseband precoder may be represented as, $$fd_i = f(x) = \begin{cases} \frac{\text{Total number of beams possible}}{\text{Number of beams selected}} & 0, \text{ beam } i \text{ is not selected} \\ & 1, \text{ beam } i \text{ is selected} \end{cases}$$

Beam Loading may be performed. In beam loading (e.g., in which the beam may be based on antenna, polarization, physical Antenna Array, and/or Antenna panel), the elements of the baseband precoder may be set to $0 \leq fd_i \leq 1$.

For example, the power on not selected beams may be set to zero. Selected beams may have a level of power that is based on an optimization criterion. The optimization criterion may include a capacity criterion such that better beams have more power. The optimization criterion may include an equal error criterion such that worse beams have more power. With restrictions to $fd_i$, beam loading may include both beam selection and open loop transmission.

The amount of CSI and/or feedback needed for beam loading may increase when compared with beam selection. For example, beam loading may require more CSI and/or feedback than beam selection.

The feedback per beam may be a number indicating the amount of energy to be used on the beam. The receiver may make the beam loading decision. The feedback per beam may include a direct dBm value. The feedback per beam may include the RSSI required by the receiver for the respective beam.

The feedback per beam may be a desired metric such as SNR, SINR, or RSSI. The feedback per beam may be the effective channel after beamforming. The transmitter may determine whether the beam should be selected based on the feedback per beam.

Beam selection and/or beam loading may be used for robust transmission, for example, in cases where a path is blocked.

For beam selection and beam loading, information may be needed at the transmitter. The transmitter and/or receiver may perform a beam-pair sweep procedure (e.g., to identify one or more best beam pairs) with the receiver sending feedback information to the transmitter to enable selection of the best transmission mode. The feedback information may include one or more beam metrics (e.g., such as the SNR, SINR, MCS, channel correlation, RSSI, explicit effective channel). The feedback information may include an indication from the receiver to use a specific mode (e.g., in the case that the receiver estimates the channel and makes the decision).

The measurement phase may include a sweep over the transmitter and receiver beams selected in the eSLS or eBRP phase. The sweep may be an exhaustive sweep. An exhaustive sweep may include a sweep of the possible Tx and Rx beams. For example, if there are 2 Tx beams (e.g., A, B) and 3 Rx beams (e.g., C, D, E), an exhaustive sweep may sweep 6 times (e.g., A/C, A/D, A/E, B/C, B/D and B/E).

An exhaustive sweep over the transmitter and receiver beams selected in the eSLS or eBRP phase may be performed and may result in an accurate estimate of the beams. The measurement phase may be efficient in that the beams may be constructed simultaneously and estimated simultaneously using orthogonal signals (e.g., either based on the signal construction itself or based on spatial separation). In examples, beam measurement may need to occur sequentially, which may result in large latencies to discover the best beam pair.

Figure 23:
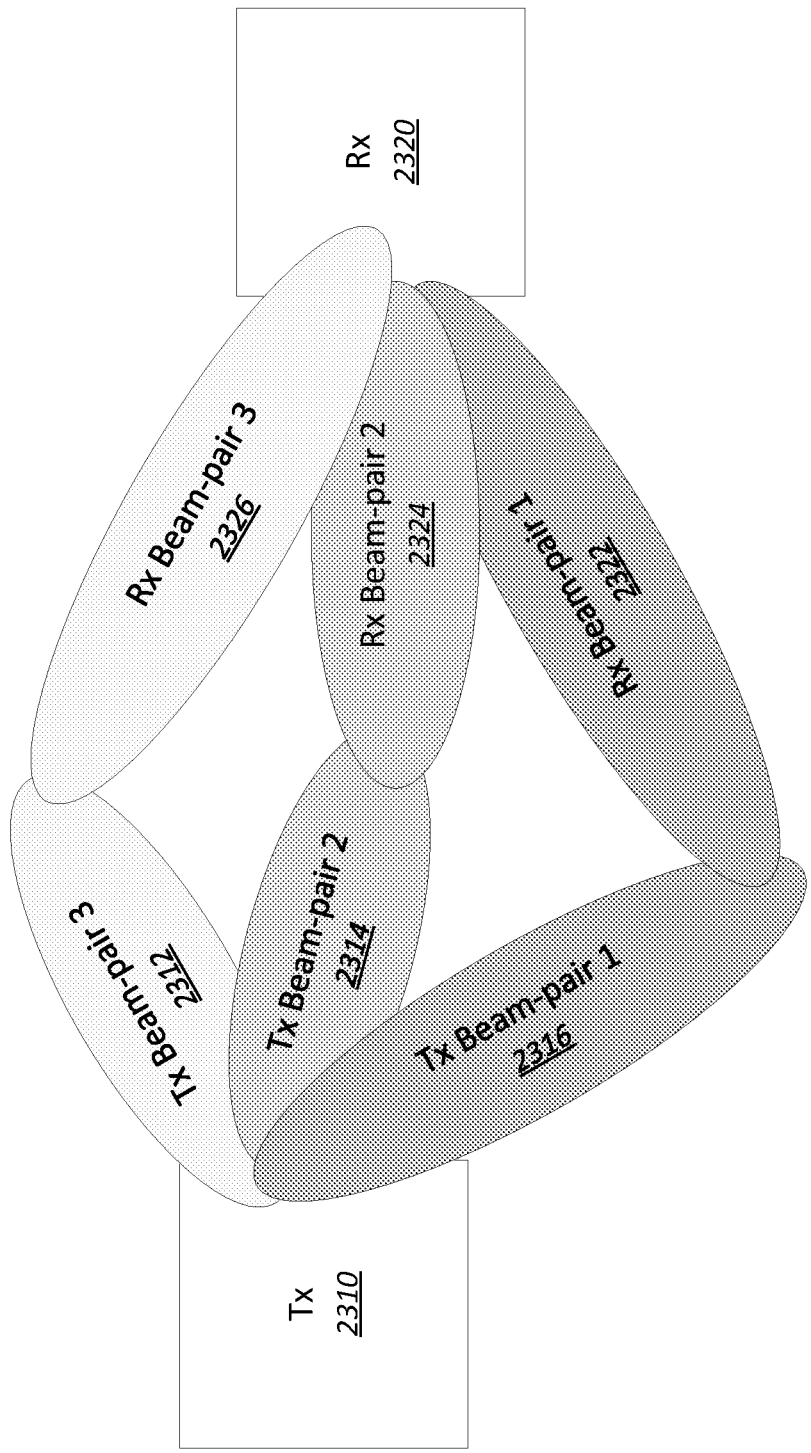
FIG. 23 is an exemplary transmit (Tx)-receive (Rx) pair with three beam pairs estimated.

FIG. 23 is an exemplary Tx-Rx pair with three beam pairs estimated from eSLS or eBRP. As shown in FIG. 23, an exemplary transmitter receiver pair may include three beam pairs estimated from an eSLS and/or eBRP. For example, a transmitter 2310 may enable transmission of one or more transmit beam pairs. The one or more transmit beam pairs may include Tx Beam-pair 1 2312, Tx Beam-pair 2 2314, and/or Tx Beam-pair 3 2316. A receiver 2320 may enable one or more receive beam pairs. The one or more receive beam pairs may include Rx Beam-pair 1 2322, Rx Beam-pair 2 2324, and/or Rx Beam-pair 3 2326.

Figure 24:
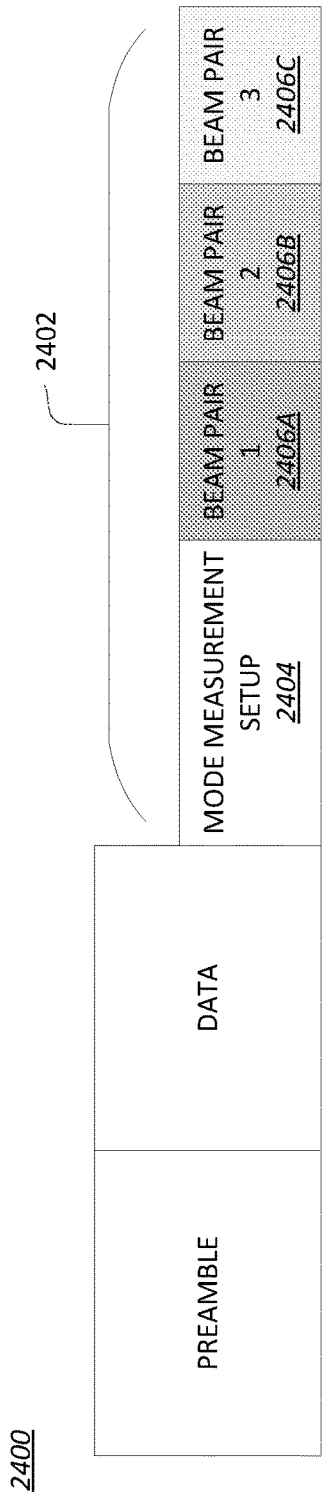
FIG. 24 is an exemplary sequential measurement.
Figure 25:
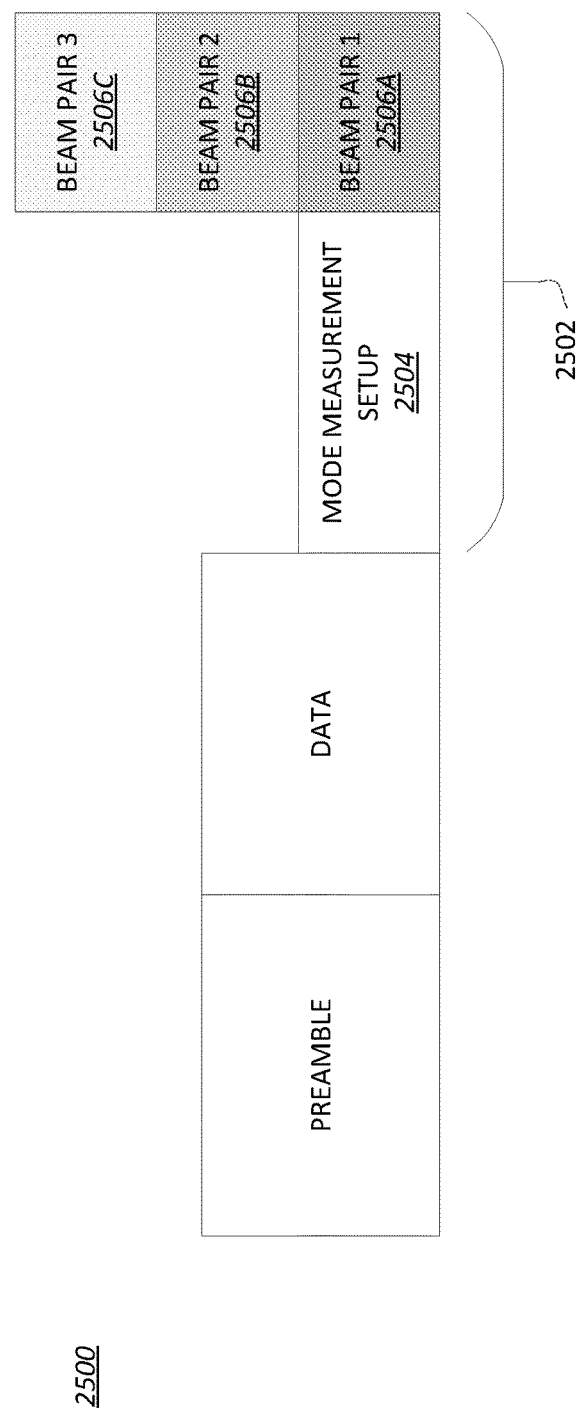
FIG. 25 is an exemplary parallel measurement.

To perform a type 1 measurement, a control trailer may be used. The control trailer may be used to set up the measurement mode (e.g., such that both transmitter and receiver know to set their beams to the selected beam pairs). The control trailer may be added to a data frame. The control trailer may include a mode measurement setup field. The control trailer may include a sequence, for example, to facilitate measurement (e.g., the type 1 measurement). The measurement may be sequential, e.g., as shown in FIG. 24. The measurement may be sent simultaneously, e.g., as shown in FIG. 25. The measurement may be sent as a combination of sequential and simultaneous, e.g., as shown in FIG. 26. A set of standalone frames may be used in which the initiator may send a mode measurement announcement. The mode measurement setup field may indicate the measuring sequence.

FIG. 24 is an exemplary frame 2400 for a sequential beam pair measurement. The frame 2400 may be a data frame. For a sequential beam pair measurement, the Tx and Rx may need to know the order and/or timing of the beams to enable proper measurement. A control trailer 2402 may be added to the frame 2400. For example, the frame 2400 may include the control trailer 2402. The control trailer 2402 may include a mode measurement setup field 2404 and one or more sequence fields 2406A, 2406B, 2406C. The mode measurement setup field 2404 may indicate a sequential beam pair measurement and may indicate the type and order for measurement of the beam pairs. The sequence fields 2406A, 2406B, 2406C may be measurement signals and/or training fields. The sequence fields 2406A, 2406B, 2406C may be used to measure the beam pairs.

FIG. 25 is an exemplary frame 2500 for a parallel beam pair measurement. The frame 2500 may be a data frame. For a parallel beam pair measurement, both Tx and Rx may need to know the order and/or timing of the beams to enable proper measurement. A control trailer 2502 may be added to the frame 2500. For example, the frame 2500 may include the control trailer 2502. The control trailer 2502 may include a mode measurement setup field 2504 and one or more beam pair measurement/training fields 2506A, 2506B, 2506C. The mode measurement setup field 2504 may indicate a parallel (e.g., simultaneous) beam pair measurement and/or the order in which the parallel beam pair measurement may be performed.

FIG. 26 is an exemplary frame 2600 for a sequential and parallel beam pair measurement. The frame 2600 may be a data frame. A control trailer 2602 may be added to the frame 2600. For example, the frame 2600 may include the control trailer 2602. The control trailer 2602 may include a mode measurement setup field 2604. The mode measurement field 2604 may indicate a sequential and parallel beam pair measurement. A sequential and parallel beam pair measurement may include measuring two or more first beam pairs 2606A, 2606B simultaneously at a first time. The sequential and parallel beam pair measurement may include measuring two or more second beam pairs 2606C, 2606D at a second time. For example, the first beam pairs 2606A, 2606B may be measured first. The second beam pairs 2606C, 2606D may be measured second.

FIG. 27 is an exemplary feedback per beam pair. For example, feedback may be sent for each beam pair. Feedback may include a feedback beam pair 1 field 2702, a feedback beam pair 2 field 2704, and/or a feedback beam pair 3 field 2706. The order of the feedback may be explicitly signaled, for example, during the mode measurement setup. The order of the feedback may be implicitly derived, for example, based on the mode measurement setup. Alternatively, the PCP/AP may poll each user independently to request feedback. The feedback between beam pairs may be sent adjacent to each other or may be separated by a desired interframe spacing e.g., SIFS.

FIG. 28 is an exemplary standalone sequential measurement frame 2800. For example, instead of including the mode measurement setup frame and associated sequence fields as a control trailer to a data frame, the mode measurement setup field 2802 and associated sequence fields 2804A, 2804B, 2804C may be a standalone frame.

The measurement phase may include a Quasi-Omni transmission at the transmitter with a sweep of the beams selected in the eSLS or eBRP phase at the receiver.

A Quasi-Omni transmission may assume that a beam metric associated with only receive beams correlates to another beam metric associated with the selected transmitter-receiver beam pair. Knowledge of the best receiver beam may indicate knowledge of the best beam pair. A Quasi-Omni transmission may result in a reduction in the latency, for example, if sequential or sequential+parallel measurements are used. A Quasi-Omni transmission may allow for simultaneous measurement to multiple receivers from a single transmitter, e.g., during the beacon transmission interval.

Figure 29:
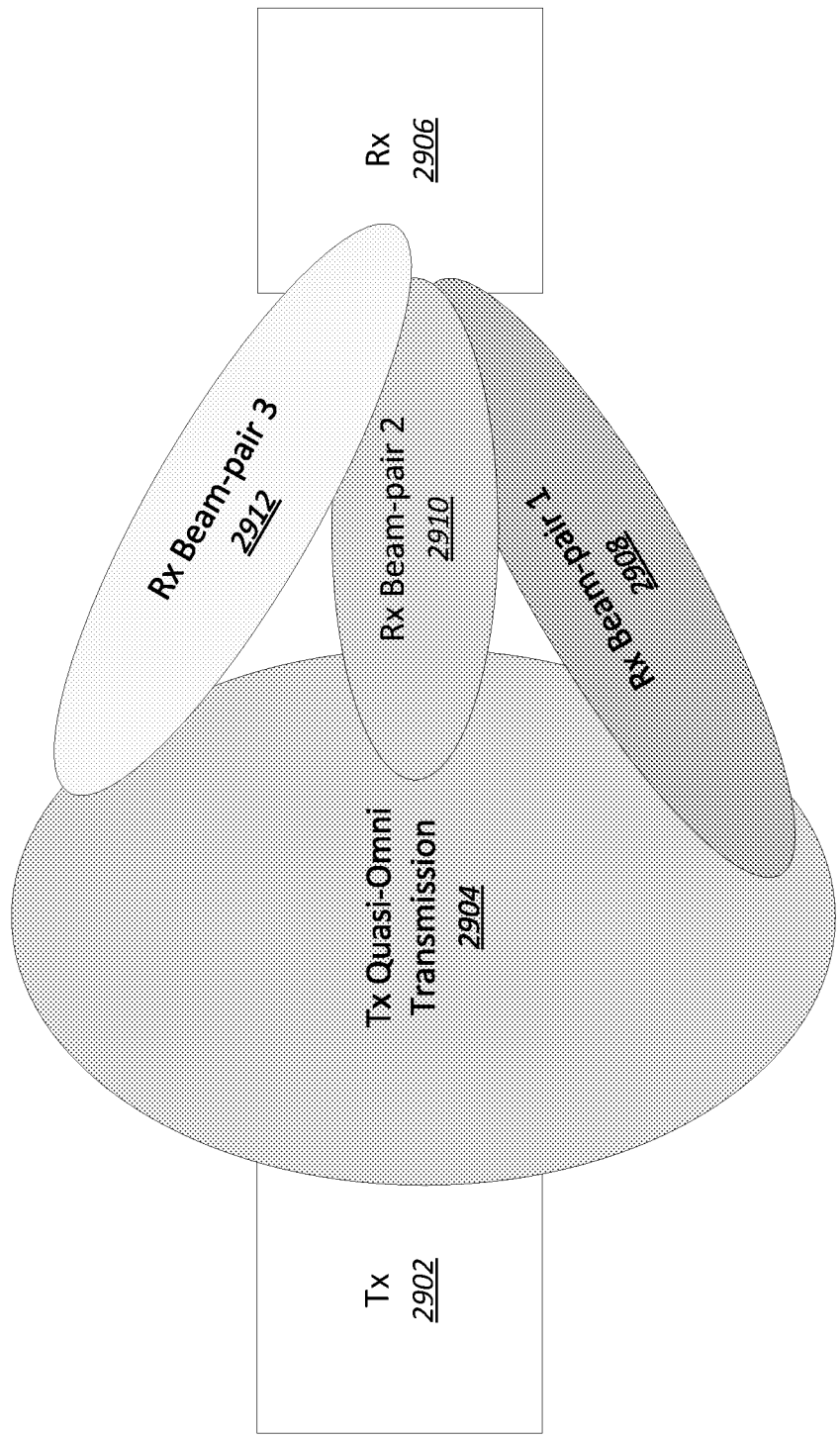
FIG. 29 is an exemplary Tx-Rx pair with Quasi-Omni (QO) transmission.

FIG. 29 is an exemplary Tx-Rx pair with Quasi-Omni Transmission. A transmitter 2902 may transmit using one or more beams discovered and/or selected in an eSLS and/or an eBRP. The transmitter 2902 may send a Tx Quasi-Omni Transmission 2904. A receiver 2906 may receive the Tx Quasi-Omni Transmission 2904 via one or more beam pairs. For example, the receiver 2906 may receive the Tx Quasi-Omni Transmission 2904 via Rx Beam-pair 1 2908, Rx Beam-pair 2 2910, and/or Rx Beam-pair 3 2912.

Omni-directional beams may have equal gain in all directions. Quasi-omni beams may be almost omni-directional, but may have gains greater than or less than an average when compared with the equal gain beams. As such, a Quasi-Omni (QO) beam may be associated with a penalty in a certain direction, for example, because the QO beam is not Omni-directional. The penalty may be estimated as the difference between the gain of the beam in the certain direction and a reference gain e.g., the average beam or the beam on the boresight (towards the receiver). The penalty may need to be estimated and/or compensated for to enable the system to estimate gains correctly while using a QO beam rather than a specific beam pair e.g., as illustrated in FIG. 29.

A transmitter/receiver may request a QO and/or directional beam calibration. The receiver/transmitter may transmit/receive one or more channel estimation frame signals, for example, with a first set of channel estimation frame signals using the QO beam and a second set of channel estimation frame signals using the directional beam. The transmitter/receiver may estimate the difference in channel gain between the QO beam and the directional beam. The difference in channel gain may be used during a beam adaptation, e.g., associated with FIG. 30.

FIG. 30 is an exemplary frame 3000 for STA-specific penalty calibration. The STA-specific penalty calibration frame 3000 may include a QO calibration setup field 3002, a QO beam CEF field 3004, and/or a Beam CEF field 3006.

FIG. 31 is an exemplary frame 3100 for beam-sweep penalty calibration. For example, an AP may perform a beam sweep in which the AP may transmit using a QO beam. The AP may sweep through the beams selected by the associated STAs. The beam sweep may reduce the overhead when compared with a STA-specific beam sweep penalty calibration. A beam-sweep penalty calibration frame 3100 may include a QO calibration setup field 3102, a QO Beam CEF field 3104, a Beam 1 CEF field 3106, a Beam 2 CEF field 3108, and/or a Beam 3 CEF field 3110.

The measurement phase may include a sweep of the transmitter beams selected in the eSLS or eBRP phase with QO beams at the receiver.

Figure 32:
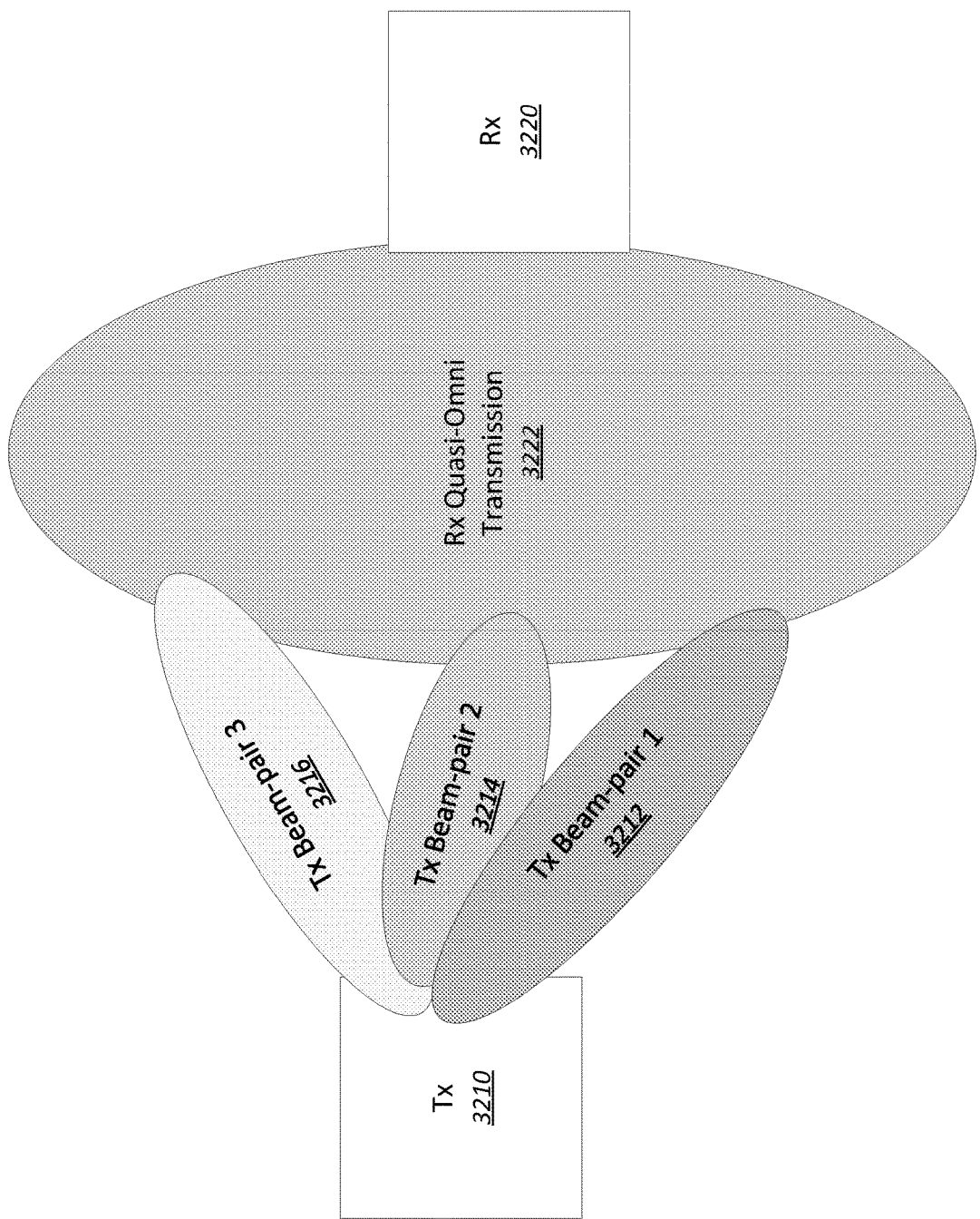
FIG. 32 is an exemplary Tx-Rx pair with QO reception.

FIG. 32 is an exemplary TX-RX pair with QO reception. Tx may be set to beams discovered and/or selected in eSLS and/or eBRP. A transmitter 3210 may transmit via one or more transmit beam pairs. For example, the transmitter 3210 may transmit via Tx Beam-pair 1 3212, Tx Beam-pair 2 3214, and/or Tx Beam-pair 3 3216. A receiver 3220 may receive via a QO beam 3222.

A beam metric with only transmit beams may be assumed to correlate to a beam metric with the transmitter-receiver beam pair selected. As such, knowledge of a best transmitter beam may indicate knowledge of the best beam pair. A sweep of the transmitter beams selected in the eSLS or eBRP phase with QO beams at the receiver may result in a reduction in the latency, for example, due to measurement for MIMO mode adaptation in the case of sequential measurement. A sweep of the transmitter beams selected in the eSLS or eBRP phase with QO beams at the receiver may be used in an uplink measurement.

A sweep of the transmitter beams selected in the eSLS or eBRP phase with QO beams at the receiver may need a penalty calibration.

MIMO adaptation may be performed in an analogue mmWave system. One or more of the following may be performed.

One or more Tx/Rx beams may have been set up using enhanced SLS and/or enhanced BRP. A transmitter may initiate a MIMO Mode Measurement. The transmitter may send a MIMO Mode Measurement setup Frame that is associated with the MIMO Mode Measurement. The MIMO Mode Measurement setup frame may indicate the desired receiver(s), the possible modes, and/or parameters such as number of beams etc. For example, the MIMO Mode Measurement setup frame may indicate one or more transmit beams. The possible modes that may be indicated by the MIMO Mode Measurement setup frame may include a MIMO Mode, a Polarization Mode, and/or an OFDMA mode. The MIMO Mode Measurement setup frame may be a standalone frame (e.g., such as the exemplary standalone sequential measurement frame shown in FIG. 28). When the MIMO Mode Measurement setup frame is a standalone frame, a measurement announcement frame may be used, for example, to ensure that the receiving STA knows that there will be a mode measurement setup frame pending. The MIMO mode measurement setup frame may be appended to a data transmission in a control trailer (e.g., such as in FIG. 24, FIG. 25, and/or FIG. 26). When the MIMO mode measurement setup frame is appended to a data transmission in a control trailer, the announcement may be included in a preamble of the data transmission frame.

A receiver STA may switch to receive mode to prepare for measurement. For example, the receiver may enable one or more modes indicated by the MIMO Mode Measurement setup frame. In an example, a configurable dummy transmission (e.g., a dummy signal) may be included between the mode measurement frame setup and the measurement sequences. The configurable dummy transmission may allow the receiver STA to switch its beams to a correct physical receiver mode. The correct physical receiver mode may be determined based on the MIMO Mode Measurement setup frame. The dummy transmission may be configured such that the receiver can enable the one or more modes indicated by the MIMO Mode Measurement setup frame. A gap duration (e.g., of the configurable dummy transmission) may be sent in the preamble of the frame.

A receiver (e.g., a receiver STA) may measure the best beam and/or beam pairs depending on the measurement Type. For example, the receiver may measure the one or more transmit beams indicated by the MIMO Mode Measurement setup frame. The receiver may measure the transmit beams during a training period.

The receiver may send feedback information to the transmitter. The feedback information may be based on a metric, for example, for each analog beam. The feedback information may be associated with the training period. For example, the feedback information may be sent for the one or more transmit beams measured during the training period. The feedback information may indicate a MIMO mode to use. The feedback information may indicate a metric (e.g., SNR/RSSI required) for each beam. The transmitter may make a MIMO Mode switch decision based on the feedback information.

A transmitter may send a MIMO setup frame to a receiver. The MIMO setup frame may indicate to set up a desired transmission. The transmitter may send a MIMO transmission. The receiver may send an ACK frame to the transmitter, for example, upon successful reception of the MIMO transmission.

Figure 33:
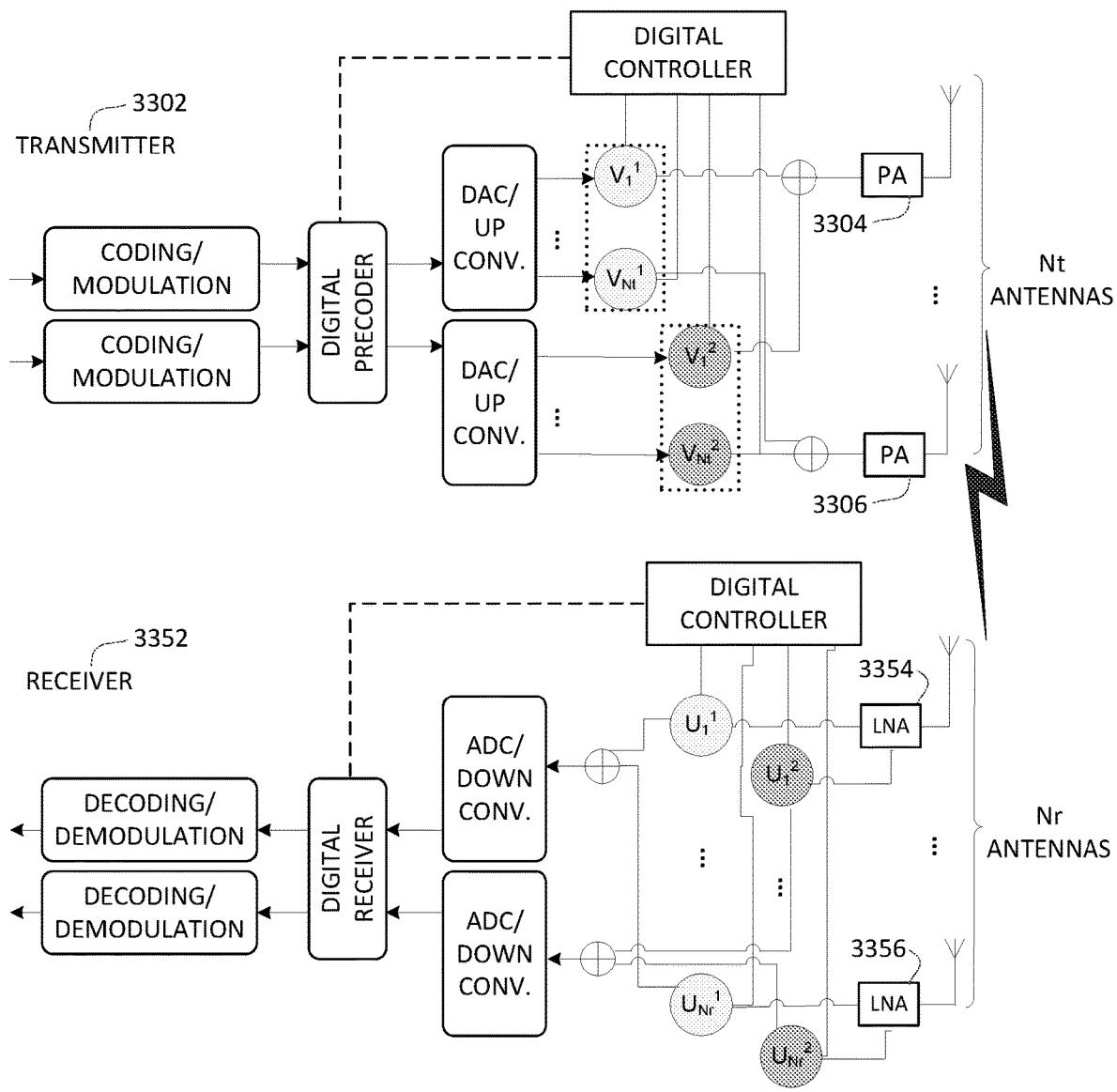
FIG. 33 is an exemplary hybrid architecture with all PAs excited by all weights.

FIG. 33 is an exemplary hybrid architecture with all PAs excited by all weights. A transmitter 3302 may send multiple streams that may have different weights via two or more PAs (e.g., such as PAs 3304, 3306). For example, each PA may be used to send the multiple streams. PA 3304 and PA 3306 may each be excited by the different weights of the multiple streams. A receiver 3352 may receive the one or more streams via two or more low-noise amplifiers (LNAs) (e.g., such as LNAs, 3354, 3356).

Figure 34:
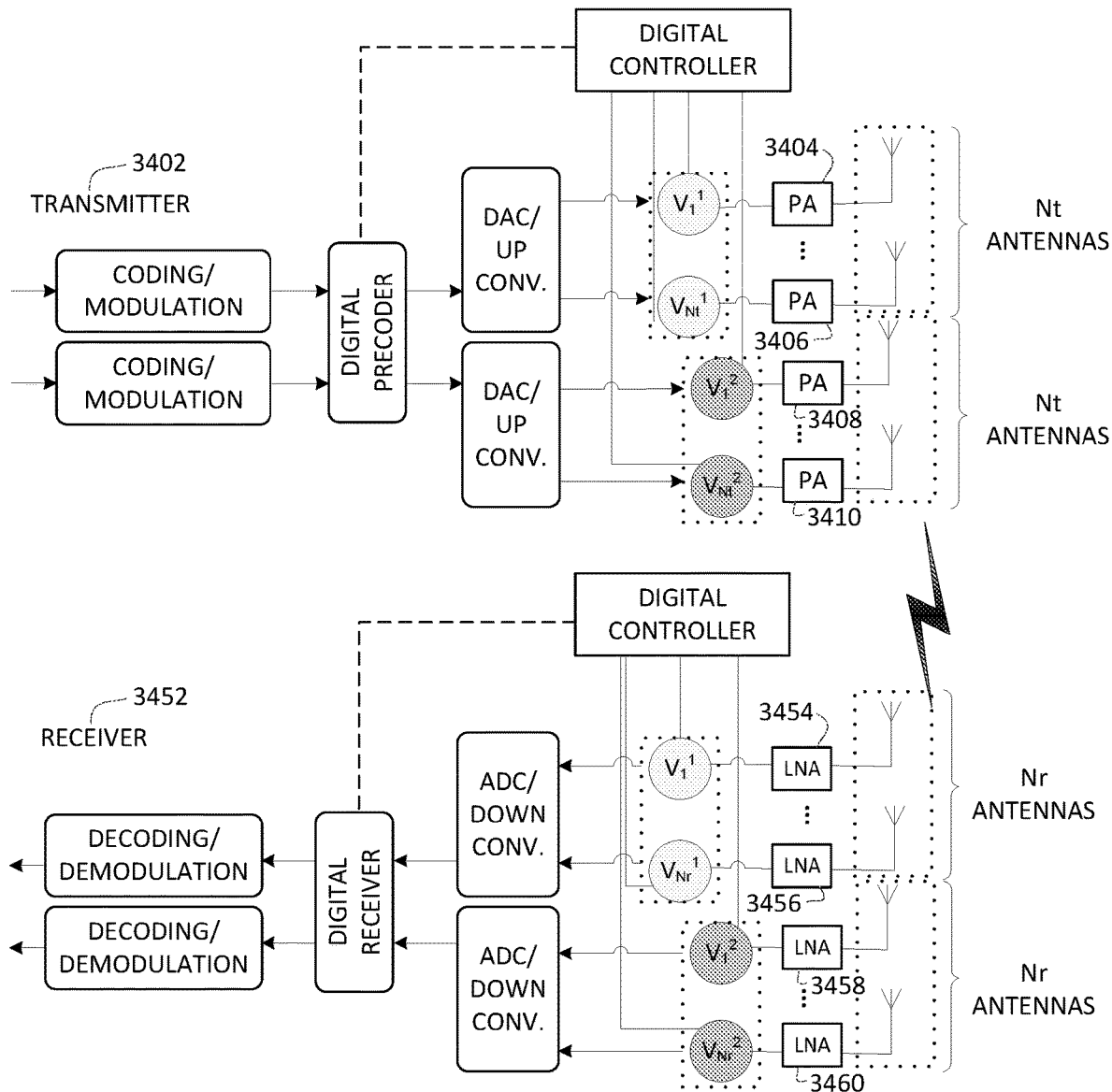
FIG. 34 is an exemplary hybrid architecture with different PAs excited by separate weights.

FIG. 34 is an exemplary hybrid architecture with different PAs excited by separate weights. A transmitter 3402 may send streams with different weights via separate PAs. For example, a first weight of a first stream may be sent via a first PA 3404. A second weight of the first stream may be sent via a second PA 3406. A third weight of a second stream may be sent via a third PA 3408. A fourth weight of a second stream may be sent via a fourth PA 3410. A receiver 3452 may receive streams with different weights via separate LNAs. For example, each LNA may be configured to receive a stream having a certain weight. A first weight of a first stream may be received via a first LNA 3454. A second weight of the first stream may be received via a second LNA 3456. A third weight of a second stream may be received via a third LNA 3458. A fourth weight of a second stream may be received via a fourth LNA 3460.

A transmitter and/or receiver may use a beam search algorithm. The beam search algorithm may include an enhanced sector level sweep and/or an enhanced beam refinement. The transmitter and/or receiver may identify one or more best transmit/receive beam pairs between the devices using the beam search algorithm. The transmitter and/or receiver may fix the identified beam pairs. A channel may be estimated using information from an effective digital channel based on the analog beams. An optimal analogue-digital precoder pair may be determined using the information from the effective digital channel.

A generalized model of the transmission phase may be represented as:

$$yH \cdot F_{RF} \cdot F_{BB} \cdot x$$

where y is the received signal before any receiver processing, H is the channel, $F_{RF}$ is the analogue precoder, $F_{BB}$ is the baseband precoder, and x is the transmitted signal. The generalized model of the transmission phase be further modeled as:

$$Y = H[\,fa_1 \, \ldots \, fa_n\,] \begin{bmatrix} fd_{11} & \cdots & fd_{1n} \\ \vdots & \ddots & \vdots \\ fd_{n1} & \cdots & fd_{nn} \end{bmatrix} \begin{bmatrix} x_1 \\ \vdots \\ x_n \end{bmatrix} \frac{1}{\sqrt{\Sigma |fd_i|^2}}$$

where $fa_1$ is a vector representing the ith analogue beam of the analogue precoder (FRF) preselected by the eSLS or eBRP, fd are the elements of the matrix representing the digital precoder (FBB), xis the data stream on the ith beam, n is the total number of beams, and $$\frac{1}{\sqrt{\Sigma |fd_{ij}|^2}}$$

is a power normalization factor. The full precoder may allow for full flexibility in the digital domain including beam selection, beam loading, open and closed loop MIMO spatial multiplexing, and/or diversity.

Digital MIMO Measurement and Mode Adaptation may include performing baseband precoding before the analog beams, which may be different than an analog only method. Channel state information may be exact or partial.

Digital MIMO Measurement and Mode Adaptation may include one or more of the following.

It may be assumed that Tx/Rx beams have been set up using enhanced SLS and/or enhanced BRP. A transmitter (e.g., a transmitter AP) and a receiver (e.g., a receiver STA) stay in beamforming mode. The transmitter may send N_transmit_beam channel estimation frame with orthogonal CEF. The receiver may estimate a Tx/Rx MIMO channel. The receiver may estimate a MIMO mode. With hybrid beamforming, a full rank transmission MIMO mode and/or a non-full rank transmission MIMO mode may be used.

A full rank transmission MIMO mode may be used for throughput enhancement. Full rank transmission may include closed loop and/or open loop transmission. In closed loop, a precoder may be designed based on full channel state information. Full channel state information may be based on feedback of the CSI to the transmitter and/or feedback of the designed precoder to the transmitter. In open loop, no CSI may be needed. Open loop transmission may include simple spatial multiplexing or a hybrid of diversity and multiplexing with CSD.

In a non-full rank transmission MIMO mode, a number of data streams may be less than the number of beams, which may be used for robust transmission, e.g., when a path is blocked. Non-full rank transmission may include closed loop transmission (e.g., with full CSI), open loop transmission with diversity precoding such as an STBC or CSD or Open loop precoding, and/or antenna/PAA/polarization selection using partial CSI.

A receiver may send feedback to the transmitter that indicates the specific MIMO mode requested, e.g., based on the effective digital channel. The feedback may indicate the explicit channel and the transmitter may select the MIMO mode to use. The transmitter may send a MIMO setup frame to the receiver. The MIMO setup frame may set up a desired transmission. The transmitter may send a MIMO transmission. The receiver may send an ACK frame, for example, upon successful reception of the MIMO transmission.

Protocol based MIMO Measurement and Mode Adaptation may be used by the analog and hybrid structures. Rank adaptation and/or MIMO scheme selection may be based on the absence or presence of an ACK on a beam or stream. MIMO mode adaptation may be incorporated into link adaptation on the different transmit-receive beam pairs. For example, a beam-pair may be turned on/off when the link adaptation drops the MCS supportable by the channel to zero. Non-Protocol based MIMO Measurement and Mode Adaptation link adaptation may drop the link MCS to the minimum MCS supportable (e.g., BPSK rate ½). A failure resulting from a collision may be distinguished from a failure resulting from a weak signal.

Protocol based MIMO Measurement and Mode Adaptation may include one or more of the following.

The Tx/Rx beams may be assumed to have been set up using eSLS and/or eBRP. MIMO data transmission may be assumed to be on-going, for example, based on the transmit-receive beam pairs selected. Each Tx-Rx beam pair may adapt its MCS independently. For example, the MCS level may be adjusted based on the number of ACKS received (e.g., frame loss MCS adaptation based). A no-transmit MCS may be added to the list of possible MCSs. A failure of the minimum MCS may result in turning off the beam for a set amount of time. Turning off the beam for a set amount of team may include implementing protocol based beam selection. Restart of transmission on a beam may be based on expiration of a timer (e.g., the lowest MCS may be transmitted after a certain amount of time has elapsed). The elapsed time may be parameterized. Restart of transmission on a beam may be based on an MCS request frame. The MCS request frame may be sent from the transmitter to the receiver to request a desired MCS. The MCS request frame may be beam specific or may be a request for all beams. The MCS request frame may be sent in the preamble, during data transmission, or in a control trailer.

A dummy transmission may be sent with channel bonding. A valid or dummy frame may be sent on the primary channel, for example, when an AP is sending data to a STA (e.g., STA x) that is only available to receive on the secondary channel(s).

A valid frame may be a frame to another STA whose primary channel is not busy.

A dummy frame may be a NDP frame with a preamble that signals frame/TXOP length, such that a STA that intends to transmit to AP on the primary channel would have CCA indicating busy on the primary channel for the duration.

The dummy frame may indicate the network allocation vector (NAV)/TXOP/frame duration is conditional for the transmission to the transmitter of the dummy frame. For transmissions in other BSS, or not to the transmitter of dummy frame, the NAV may not apply.

The NAV/TXOP/frame duration, indicated by the dummy frame, may require that transmission by other STAs on the primary channel end before the time indicated by the indicated NAV/TXOP/frame duration. An AP/PCP may not have uncertainty on the TXOP setting/holder of the primary channel after its transmission on the secondary channel.

The preamble to STA x on its selected channel(s), may indicate the actual data transmission is a subset of the channels indicated as CCA idle by the STA x.

Two STAs, e.g., an EDMG AP/PCP and an EDMG STA, may adapt the transmissions/reception mode. The transmission and/or reception mode may include a MIMO mode, a polarization mode, and/or an OFDMA mode.

Figure 35:
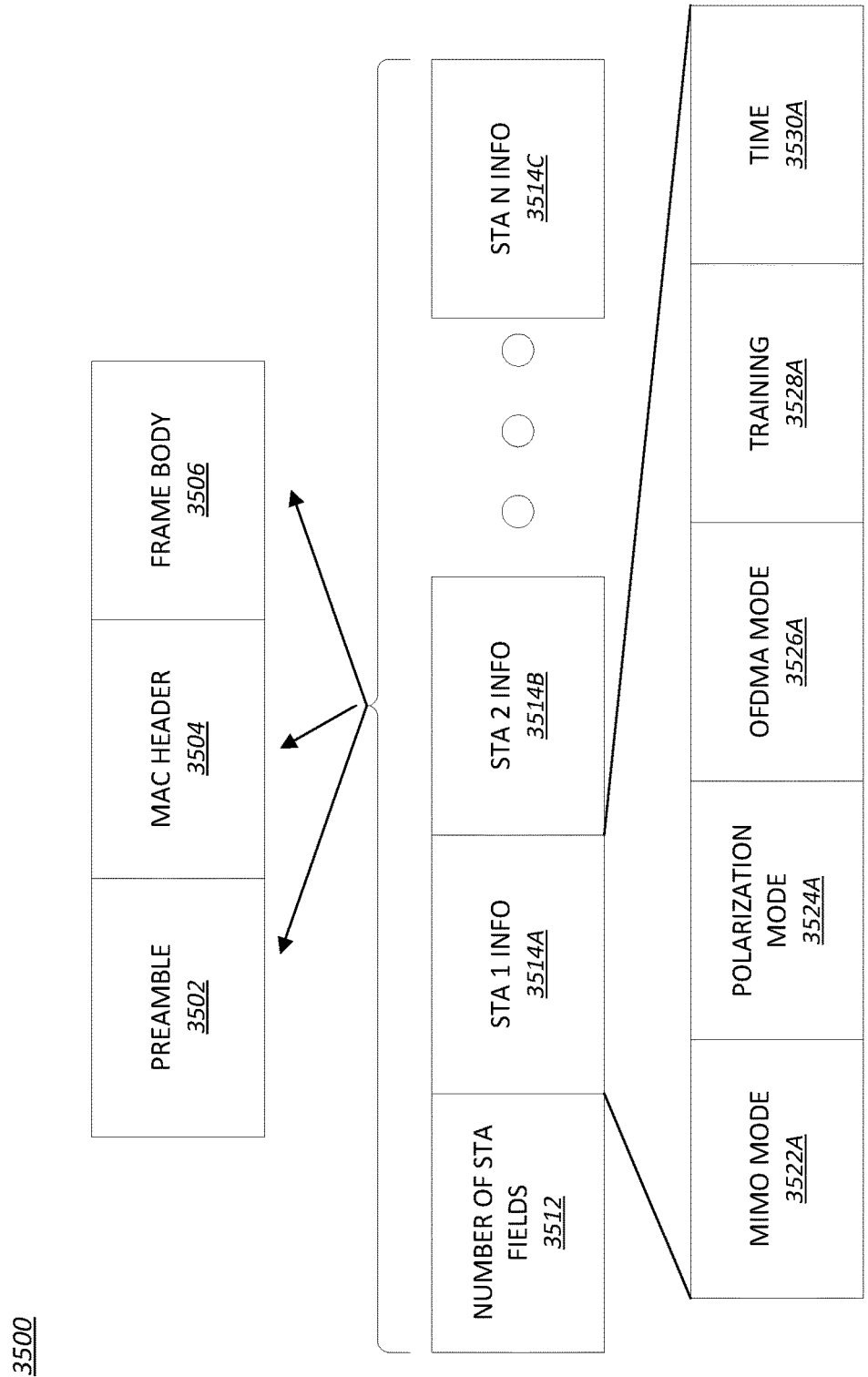
FIG. 35 is an exemplary Tx-Rx mode change request frame.

FIG. 35 is an exemplary Tx/Rx mode change request frame 3500. A STA (e.g., including an EDMG AP/PCP) may use a Tx/Rx Mode Change Request frame 3500 to request that one or more EDMG STAs change the transmission mode and/or the reception mode between the one or more EDMG STAs and the requesting STA. The transmission mode and/or reception mode may include a MIMO mode, a polarization mode, and/or an OFDMA mode. The STA may send the Tx/Rx mode change request frame 3500 based on training feedback received from a receiving STA. The Tx/Rx mode change request frame 3500 may be configured to indicate a mode change for one or more modes, for example, that were initiated by a MIMO Mode Measurement setup frame.

A Tx/Rx Mode Change Request frame 3500 may include one or more of the following fields in its Preamble 3502, MAC Header 3504, and/or frame body 3506. A Tx/Rx mode change request frame 3500 may include a number of STAs field 3512. The number of STAs field 3512 may indicate the number of STA Info fields that are included in the Tx Mode Change Request frame 3500. A Tx/Rx mode change request frame 3500 may include one or more STA Info fields. For example, the Tx/Rx mode change request frame 3500 may include a STA 1 Info field 3514A, a STA 2 Info field 3514B, and/or a STA N Info field 3514C. The STA info fields may include information for N STAs as indicated in the Number of STAs field 3512. Each STA Info field may include information for MIMO mode, polarization mode, and/or OFDMA mode. For example, each STA Info field may include a MIMO Mode subfield, a Polarization Mode subfield, and/or an OFDMA Mode subfield.

The STA 1 Info field 3514A may include a MIMO Mode subfield 3522A, a Polarization Mode subfield 3524A, an OFDMA Mode subfield 3526A, a Training subfield 3528A, and/or a Time subfield 3530A. The MIMO Mode subfield 3522A may indicate a MIMO mode change. For example, the MIMO Mode subfield 3522A may indicate a change from a current MIMO mode (e.g., initiated by the MIMO measurement setup frame). The Polarization Mode subfield 3524A may indicate a Polarization mode change. For example, the Polarization Mode subfield 3524A may indicate a change from a current Polarization mode (e.g., initiated by the MIMO measurement setup frame). The OFDMA Mode subfield 3526A may indicate an OFDMA mode change. For example, the OFDMA Mode subfield 3526A may indicate a change from a current OFDMA mode (e.g., initiated by the MIMO measurement setup frame).

In MIMO Mode, a STA info field may include an add/remove field (e.g., subfield). An add/remove field may indicate whether MIMO Mode is requested to be added or removed. In MIMO mode, a STA info field may include a Tx/Rx field. A Tx/Rx field may be used to indicate whether MIMO Mode is requested to be added or removed for Tx and/or Rx. In MIMO mode, a STA info field may include a SU/MU field. A SU/MU field may indicate whether SU and/or MU MIMO Mode is requested to be added or removed. In MIMO Mode, a STA info field may include a maximum number of streams field. A maximum Number of Streams field may indicate a Maximum Number of Streams that are expected to be added or removed. A maximum number of streams field may indicate a Maximum Number of Streams expected to be used after the Tx/Rx mode change.

In Polarization Mode, a STA info field may include an add/remove field (e.g., subfield). An add/remove field may indicate whether Polarization mode is requested to be added or removed. In Polarization Mode, a STA info field may include a Tx/Rx field. A Tx/Rx field may indicate whether Polarization Mode is requested to be added or removed for Tx and/or Rx. In Polarization Mode, a STA info field may include a polarization type(s) field. A polarization type(s) field may indicate one or more Polarizations that are requested to be added or removed. For example, a bit map may be used to indicate one or more Polarization Types, such as Linear, Circular, Mixed. One or more fields containing a Euler angle (e.g., α, β, γ), e.g., relative to an existing coordination system or to the current polarization, for example, the current polarization used to transmit the current frame, may be used to indicate one or more polarization types that are requested to be added or removed.

In OFDMA Mode, a STA info field may include an add/remove field (e.g., subfield). An add/remove field may indicate whether OFDMA mode is requested to be added or removed. In OFDMA mode, a STA info field may include a Tx/Rx field. A Tx/Rx field may indicate whether OFDMA Mode is requested to be added or removed for Tx and/or Rx. In OFDMA mode, a STA info field may include a backwards compatible field. A backwards compatible field may indicate whether the OFDMA Mode of transmission should be backwards compatible, for example, whether the transmission of the OFDMA frames or the transmission of the preamble should follow the 11ad channel mask and/or preamble definitions. In OFDMA mode, a STA info field may include a bandwidth field. A bandwidth field may indicate the bandwidth that the OFDMA transmissions should use. A bandwidth field may indicate an allocation of the bandwidth.

A STA info field may include a training field (e.g., such as the Training subfield 3528A). A training field may indicate whether training is requested for any of the transmission mode, such as MIMO mode, polarization mode and/or OFDMA mode. For example, the training field may include a training indicator that initiates a training period associated with a mode change. The training field may include scheduling information for the training period.

A STA info field may include a time field (e.g., such as the Time subfield 3530A). A time field may indicate when the requested training and/or transmission mode change (e.g., such as change in MIMO mode, polarization mode and/or OFMDA mode) will be effective.

A Tx/Rx Mode Change Request frame 3500 may include one or more training signals. The one or more training signals may be fields in the preamble, for example, one or more EDMG-CEFs. The one or more training signals may enable the receiving STA to conduct trainings for one or more of the changes in transmission mode as requested in the TX/RX Mode Change Request frame 3500.

Figure 36:
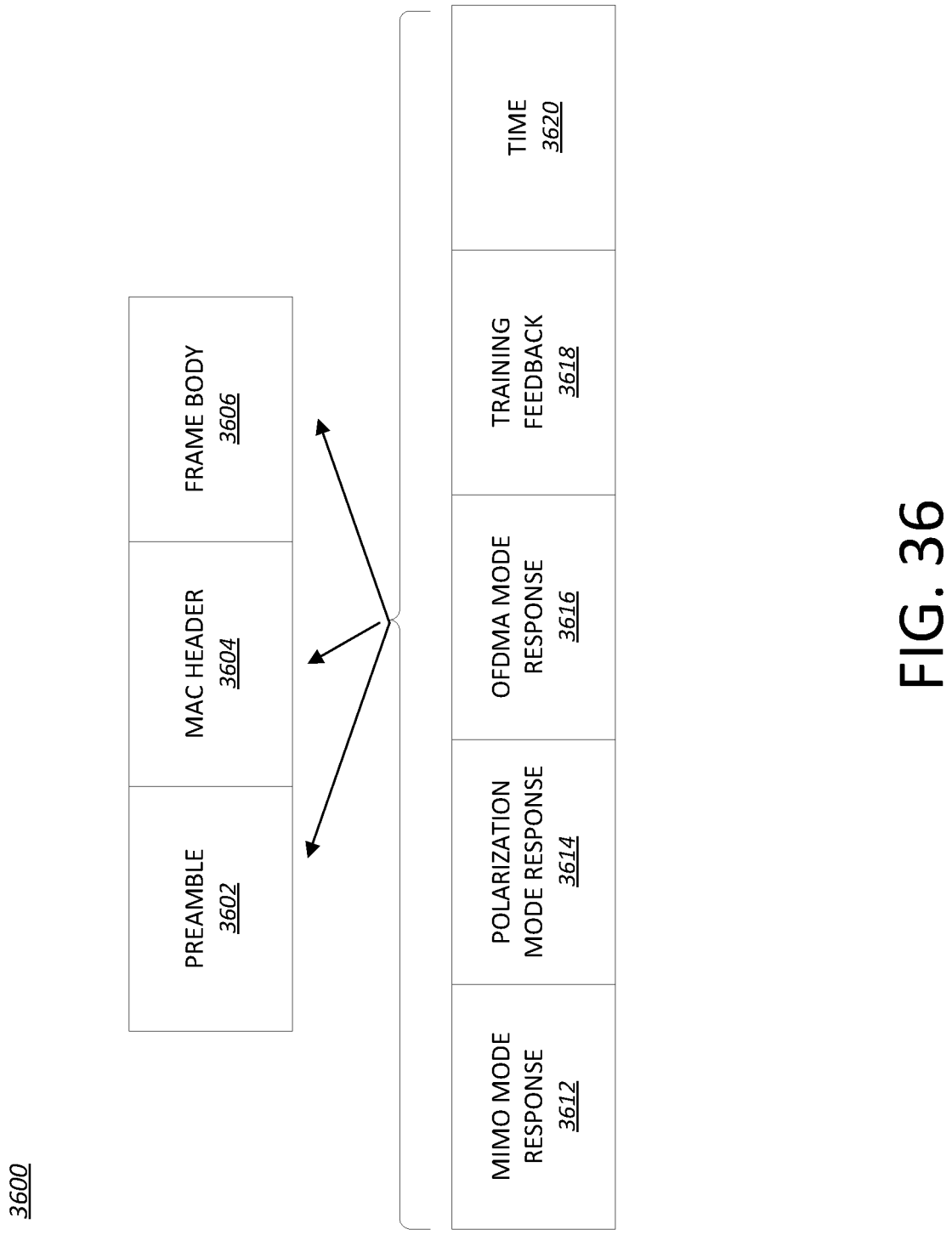
FIG. 36 is an exemplary Tx-Rx mode change response frame.

FIG. 36 is an exemplary Tx/Rx mode change response frame 3600. When receiving a Tx/Rx Mode Change Request frame (e.g., such as the Tx/Rx Mode Change Request frame 3500 shown in FIG. 35), a STA (e.g., an EDMG STA) may respond with a Tx/Rx Mode Change Response frame 3600. The Tx/Rx mode change response frame 3600 may include feedback for the training and/or may indicate results for one or more received Tx/Rx Mode Change requests.

A Tx/Rx Mode Change Response frame 3600 may include one or more of the following fields in the Preamble 3602, MAC Header 3604, and/or frame body 3606.

A Tx/Rx mode change response frame 3600 may include a MIMO Mode Response field 3612. The MIMO Mode Response field 3612 may indicate the status of the MIMO Mode change request, for example, such as Success, Fail, or an alternate mode. In case of an alternate mode, the MIMO Mode Response field 3612 may indicate a maximum number of streams.

A Tx/Rx mode change response frame 3600 may include a Polarization Mode response field 3614. A Polarization Mode response field 3614 may indicate a status of the Polarization Mode change request, for example, such as Success, Fail, or an Alternate Mode. In case of an Alternate Mode, the Polarization Mode response field 3614 may indicate a Polarization Mode that may be indicated by a bitmap, indicating linear, circular, mixed, etc. A Polarization Mode may be indicated by a Euler Angle relative to a known coordinate system or relative to the current polarization mode that should be used.

A Tx/Rx mode change response frame 3600 may include an OFDMA Mode response field 3616. An OFDMA Mode response field 3616 may indicate a status of an OFDMA Mode change request, for example, such as Success, Fail, or an Alternate Mode. In case of Alternate Mode, the OFDMA mode that should be added/removed may be indicated in the OFDMA Mode response field 3616.

A Tx/Rx mode change response frame 3600 may include a training feedback field 3618. A training feedback field 3618 may include feedback on the training related to the Tx/Rx Mode Change. For example, the training feedback field 3618 may include training feedback associated with one or more transmit beams during a training period associated with the Tx/Rx Mode Change that may have been indicated via a Tx/Rx mode change request frame.

A Tx/Rx mode change response frame 3600 may include a time field 3620. A time field 3620 may indicate the time at which the new Tx/Rx Mode change may take place.

The Tx/Rx Mode Change Request frame and/or the Tx/Rx Mode Change Response frame or any set or subset of the fields and/or subfields may be implemented as an information element, elements, or any part of Action frames, Action without ACK frames, and/or Management, Control, NDP, short, Data and Extension frames, e.g., PHY and MAC headers. For example, a Tx/Rx Mode Request may be included in (short) beacon frames to request a Tx/Rx Mode change for one or more STAs.

Tx/Rx Mode adaptation may include one or more of the following.

A STA, e.g., an EDMG STA, or an EDMG AP/PCP, may request another STA to change its Tx/Rx mode, for example, by sending a Tx/Rx Mode Change Request frame. A STA may request one or more STAs to change their Tx/Rx Mode in a broadcast/multicast frame, for example, such as in a (short) beacon frame. A STA may request one or more STAs to change their Tx/Rx Mode by including a Tx/Rx Mode Change Request frame in an aggregated frame that is transmitted to another STA. An aggregated frame may include one or more Management, Control, Data, and/or Extension frames.

A requesting STA may include one or more training fields for the requested Tx/Rx Mode Changes as part of the Tx/Rx Mode Change frames. For example, the Tx/Rx Mode Change frames may indicate a training session associated with a Tx/Rx Mode Change. The requesting STA may have conducted training sessions for the requested Tx/Rx Mode changes prior to sending the Tx/Rx Mode Change Request frame. The requesting STA may provide scheduling information for the training session needed to determine the Tx/Rx Mode Change in the Tx/Rx Mode Change Request frame.

The requesting STA may request a change in Tx/Rx MIMO mode, including SU and MU mode, number of maximal streams, and/or use of the number of PAAs/antennas. The requesting STA may request a change in Polarization Mode, for example, such as adding or removing Polarization types. The requesting STA may include a specific Polarization type, indicated by Euler Angle or any other method, for example, relative to the polarization type used to transmit the Tx/Rx Mode Change Request frame or to a known coordination system. The requesting STA may request a change in OFDMA Mode, for example, such as bandwidth, backward compatibility mode for the OFDMA transmissions.

After receiving the training frames and/or the Tx/Rx Mode Change request frame, the receiving STA may provide feedback to the training frames and/or training portions of the Tx/Rx Mode Change Request frame. The receiving STA may provide one or more responses to the requested change of MIMO mode, Polarization mode, and/or OFDMA mode. If the receiving STA decides to propose alternate changes than requested by the requesting STA, the receiving STA may provide such alternate changes in a Tx/Rx Mode Change Response frame. The receiving STA may provide a time at which the change of Tx/Rx mode may take place. The time may be the same as suggested by the requesting STA included in the Tx/Rx Mode Change Request frame.

The requesting STA and the receiving STA may adapt their Tx/Rx mode as agreed (e.g., at the time indicated in the Tx/Rx mode change request and/or response frame).

Although the features and elements of the present invention are described in particular combinations, each feature or element can be used alone without the other features and elements or in various combinations with or without other features and elements.

Although the solutions described herein consider 802.11 specific protocols, it is understood that the solutions described herein are not restricted to this scenario and are applicable to other wireless systems as well.

Figure 37A:
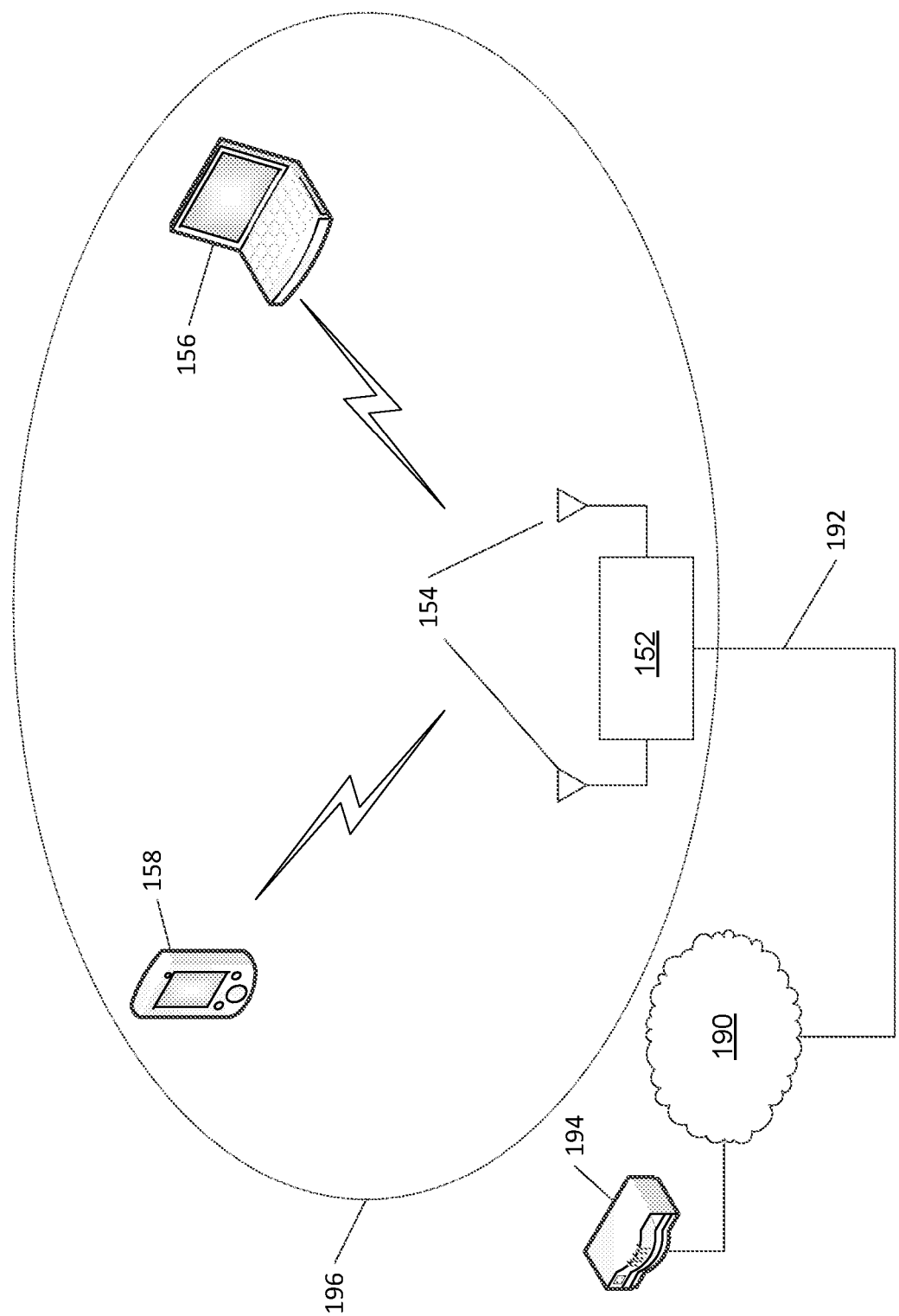
FIG. 37A illustrates exemplary wireless local area network (WLAN) devices.

FIG. 37A illustrates exemplary wireless local area network (WLAN) devices. One or more of the devices may be used to implement one or more of the features described herein. The WLAN may include, but is not limited to, access point (AP) 102, station (STA) 110, and STA 112. STA 110 and 112 may be associated with AP 102. The WLAN may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

A WLAN operating in an infrastructure mode may comprise one or more APs communicating with one or more associated STAs. An AP and STA(s) associated with the AP may comprise a basic service set (BSS). For example, AP 102, STA 110, and STA 112 may comprise BSS 122. An extended service set (ESS) may comprise one or more APs (with one or more BSSs) and STA(s) associated with the APs. An AP may have access to, and/or interface to, distribution system (DS) 116, which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN, e.g., to server 118, may be sent to an AP in the WLAN, which may send the traffic to the destination, e.g., via DS 116 to network 114 to be sent to server 118. Traffic between STAs within the WLAN may be sent through one or more APs. For example, a source STA (e.g., STA 110) may have traffic intended for a destination STA (e.g., STA 112). STA 110 may send the traffic to AP 102, and, AP 102 may send the traffic to STA 112.

A WLAN may operate in an ad-hoc mode. The ad-hoc mode WLAN may be referred to as independent basic service set (IBBS). In an ad-hoc mode WLAN, the STAs may communicate directly with each other (e.g., STA 110 may communicate with STA 112 without such communication being routed through an AP).

IEEE 802.11 devices (e.g., IEEE 802.11 APs in a BSS) may use beacon frames to announce the existence of a WLAN network. An AP, such as AP 102, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g., a BSS). Other STAs may count down the NAV to zero. When the counter reaches a value of zero, the NAV functionality may indicate to the other STA that the channel is now available.

The devices in a WLAN, such as an AP or STA, may include one or more of the following: a processor, a memory, a radio receiver and/or transmitter (e.g., which may be combined in a transceiver), one or more antennas (e.g., antennas 106 in FIG. 37A), etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 37A. The processor may be configured to execute processor executable code (e.g., instructions) including, for example, software and/or firmware instructions. For example, the processer may be configured to execute computer readable instructions included on one or more of the processor (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code or instructions (e.g., software, firmware, etc.), electronic data, databases, or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processor. The processor may communicate with one or more entities of memory, e.g., via a system bus, directly, etc.

Figure 37B:
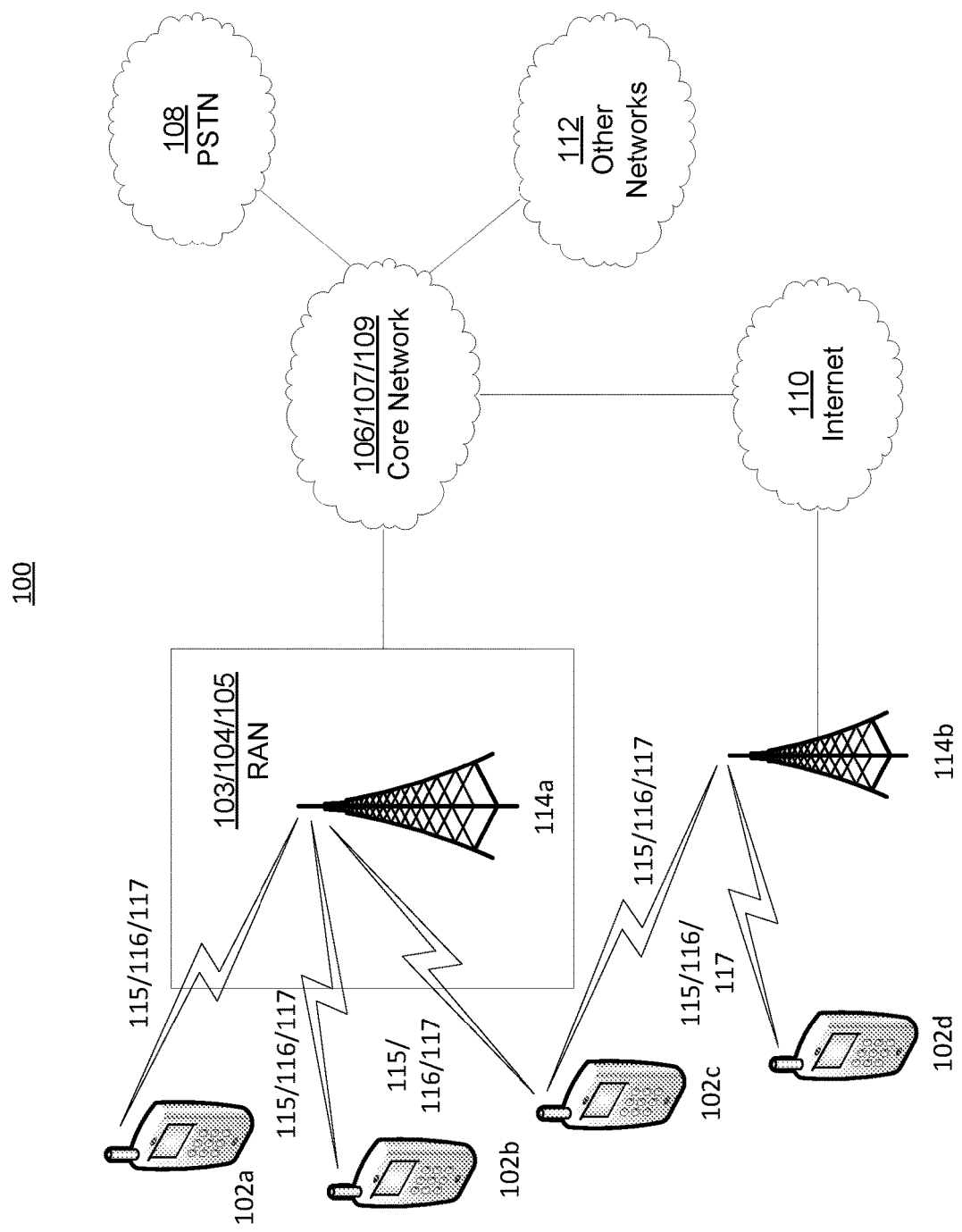
FIG. 37B is a diagram of an example communications system in which one or more disclosed features may be implemented.

FIG. 37B is a diagram of an example communications system 100 in which one or more disclosed features may be implemented. For example, a wireless network (e.g., a wireless network comprising one or more components of the communications system 100) may be configured such that bearers that extend beyond the wireless network (e.g., beyond a walled garden associated with the wireless network) may be assigned QoS characteristics.

The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 37B, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b102c102d may be configured to transmit and/or receive wireless signals and may include user equipment (UE), a mobile station (e.g., a WLAN STA), a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 37B may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 37B, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 37B, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 37B may be configured to communicate with the base station 114a, which may employ a cellular-based radio technology, and with the base station 114b, which may employ an IEEE 802 radio technology.

Figure 37C:
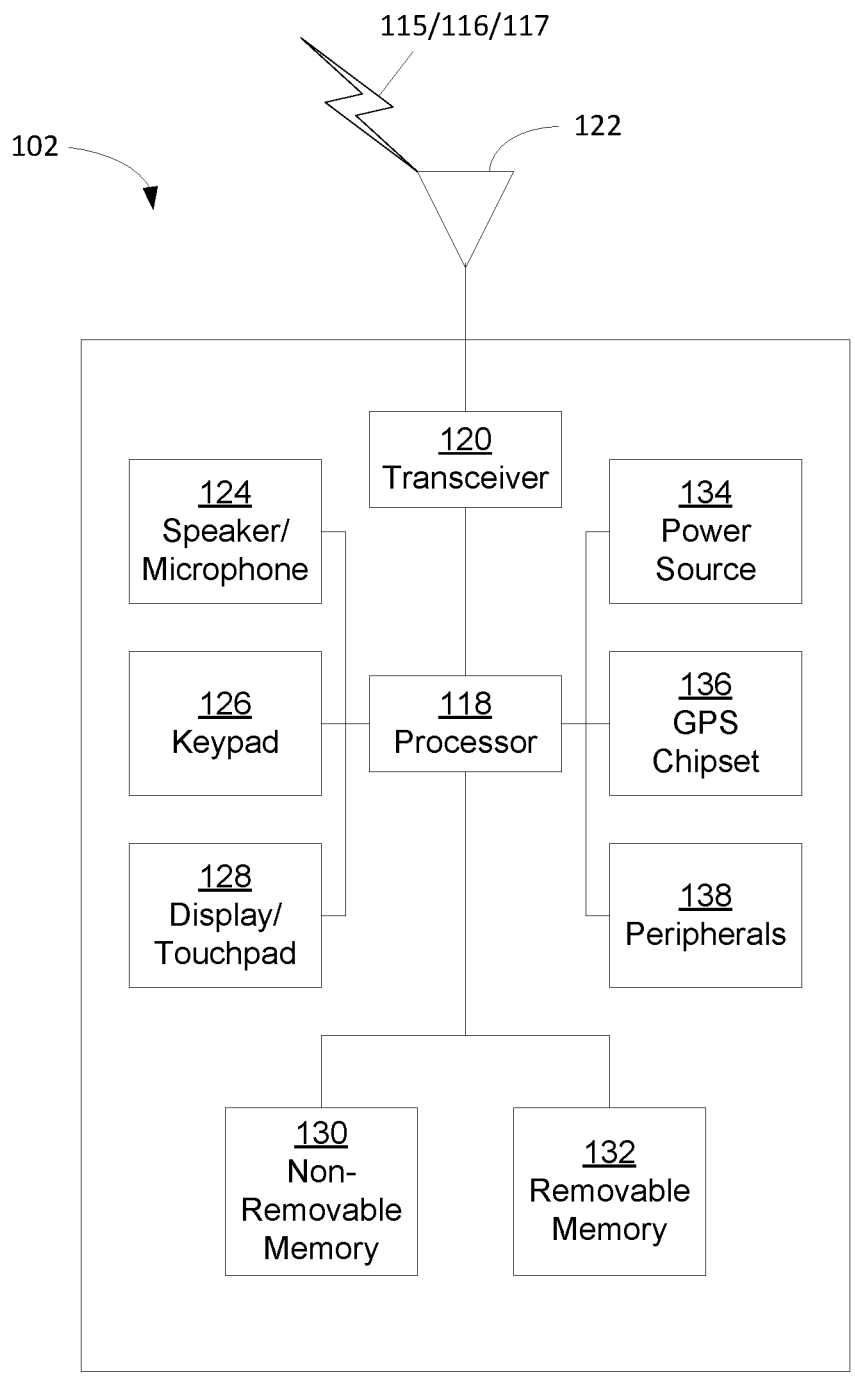
FIG. 37C depicts an exemplary wireless transmit/receive unit, WTRU.

FIG. 37C depicts an exemplary wireless transmit/receive unit, WTRU 102. A WTRU may be a user equipment (UE), a mobile station, a WLAN STA, a fixed or mobile subscriber unit, a pager, a cellular telephone, a personal digital assistant (PDA), a smartphone, a laptop, a netbook, a personal computer, a wireless sensor, consumer electronics, and the like. WTRU 102 may be used in one or more of the communications systems described herein. As shown in FIG. 37C, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 37C depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 37C as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Although features and elements may be described above in particular combinations or orders, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A station (STA) configured for polarization beamforming training, the STA comprising:
   a processor;
   receiver circuitry configured to receive, from an initiator STA, a training request frame which includes a polarization beamforming training indication;
   the receiver circuitry configured to receive, based on the polarization beamforming training indication, from the initiator STA, a plurality of training frames, the plurality of training frames including a polarization index indicating a polarization order and polarized beams transmitted in the polarization order; and
   transmitter circuitry configured to transmit, to the initiator STA, feedback based on the plurality of training frames.

2. The STA of claim 1, wherein the training request frame comprises an enhanced directional multi-gigabit (EDMG) control frame.

3. The STA of claim 1, wherein the training request frame indicates a number of polarizations to train.

4. The STA of claim 1, wherein the transmitter circuitry is configured to transmit, to the initiator STA, a response frame acknowledging reception of the training request frame.

5. The STA of claim 1, wherein the plurality of training frames includes a first set of training frames transmitted by antenna beams polarized with a first polarization, and a second set of training frames transmitted by antenna beams polarized with a second polarization.

6. The STA of claim 1, wherein the training request frame comprises a management frame.

7. The STA of claim 1, wherein the training request frame comprises a beacon frame.

8. A station (STA) configured for polarization beamforming training, the STA comprising:
   a processor;
   transmitter circuitry configured to transmit, to a responder STA, a training request frame which includes a polarization beamforming training indication;
   the transmitter circuitry configured to transmit, to the responder STA, after the training request frame, a plurality of training frames, the plurality of training frames including a polarization index indicating a polarization order and polarized beams transmitted in the polarization order; and
   receiver circuitry configured to receive, from the responder STA, feedback based on the plurality of training frames.

9. The STA of claim 8, wherein the training request frame comprises an enhanced directional multi-gigabit (EDMG) control frame.

10. The STA of claim 8, wherein the training request frame indicates a number of polarizations to train.

11. The STA of claim 8, wherein the transmitter circuitry is configured to receive, from the responder STA, a response frame acknowledging reception of the training request frame.

12. The STA of claim 8, wherein the plurality of training frames includes a first set of training frames received on antenna beams polarized with a first polarization, and a second set of training frames received on antenna beams polarized with a second polarization.

13. The STA of claim 8, wherein the training request frame comprises a management frame.

14. The STA of claim 8, wherein the training request frame comprises a beacon frame.

15. A method for polarization beamforming training implemented in a station (STA), the method comprising:
   receiving, by receiver circuitry of the STA, from an initiator STA, a training request frame which includes a polarization beamforming training indication;
   receiving, by the receiver circuitry, based on the polarization beamforming training indication, from the initiator STA, a plurality of training frames, the plurality of training frames including a polarization index indicating a polarization order and polarized beams transmitted in the polarization order; and
   transmitting, by transmitter circuitry of the STA, to the initiator STA, feedback based on the plurality of training frames.

16. The method of claim 15, wherein the training request frame comprises an enhanced directional multi-gigabit (EDMG) control frame.

17. The method of claim 15, wherein the training request frame indicates a number of polarizations to train.

18. The method of claim 15, further comprising transmitting, to the initiator STA, a response frame acknowledging reception of the training request frame.

19. The method of claim 15, wherein the plurality of training frames includes a first set of training frames transmitted by antenna beams polarized with a first polarization, and a second set of training frames transmitted by antenna beams polarized with a second polarization.

20. The method of claim 15, wherein the training request frame comprises a management frame.

* * * * *